United States Patent
Anderson et al.

(10) Patent No.: US 10,828,846 B2
(45) Date of Patent: Nov. 10, 2020

(54) METHOD AND APPARATUS FOR FABRICATING CONTOURED LAMINATE STRUCTURES

(71) Applicant: The Boeing Company, Chicago, IL (US)

(72) Inventors: Michael Robert Anderson, Renton, WA (US); Daniel M. McDonagh, Seattle, WA (US); Ryan Christopher Lucas, Puyallup, WA (US); Mark Klewiada, Seattle, WA (US); James N. Buttrick, Seattle, WA (US)

(73) Assignee: The Boeing Company, Chicago, IL (US)

( * ) Notice: Subject to any disclaimer, the term of this patent is extended or adjusted under 35 U.S.C. 154(b) by 630 days.

(21) Appl. No.: 14/525,500

(22) Filed: Oct. 28, 2014

(65) Prior Publication Data

US 2015/0041048 A1 Feb. 12, 2015

Related U.S. Application Data

(63) Continuation-in-part of application No. 13/901,813, filed on May 24, 2013, now Pat. No. 9,314,974.

(60) Provisional application No. 61/749,881, filed on Jan. 7, 2013.

(51) Int. Cl.
*B29C 70/38* (2006.01)
*B29C 70/54* (2006.01)
*B29D 99/00* (2010.01)

(52) U.S. Cl.
CPC ............ *B29C 70/38* (2013.01); *B29C 70/388* (2013.01); *B29C 70/541* (2013.01); *B29D 99/0003* (2013.01); *Y10T 156/1002* (2015.01)

(58) Field of Classification Search
CPC .................................................. B29C 70/388
See application file for complete search history.

(56) References Cited

U.S. PATENT DOCUMENTS

| | | | | |
|---|---|---|---|---|
| 4,512,837 | A | * | 4/1985 | Sarh ............... B29C 63/0034 156/189 |
| 4,601,775 | A | * | 7/1986 | Grone ............... B29C 70/388 156/488 |
| 5,352,306 | A | | 10/1994 | Grimshaw et al. |
| 7,670,525 | B2 | | 3/2010 | Weidmann et al. |
| 7,943,076 | B1 | | 5/2011 | Hawkins et al. |
| 8,151,529 | B2 | | 4/2012 | Weidmann et al. |
| 8,349,105 | B2 | | 1/2013 | Kehrl et al. |

(Continued)

FOREIGN PATENT DOCUMENTS

| | | |
|---|---|---|
| DE | 102010039955 A1 | 3/2012 |
| WO | 2006119002 A2 | 11/2006 |
| WO | 2009129007 A2 | 10/2009 |

OTHER PUBLICATIONS

State Intellectual Property Office of China Report of Second Office Action and English translation, Chinese Patent Application No. 2013800696562, dated Dec. 16, 2016, 12 pages.

(Continued)

*Primary Examiner* — Barbara J Musser
(74) *Attorney, Agent, or Firm* — Yee & Associates, P.C.

(57) ABSTRACT

Apparatus for forming composite plies on a contoured tool includes a forming head for forming the composite plies on the tool. The forming head is mounted on a manipulator and includes a compliant nosepiece adapted to conform to the contoured tool.

22 Claims, 22 Drawing Sheets

(56) References Cited

U.S. PATENT DOCUMENTS

| | | |
|---|---|---|
| 8,551,380 B2 | 10/2013 | Hawkins et al. |
| 8,632,653 B2 | 1/2014 | Brown et al. |
| 9,314,974 B2 | 4/2016 | Buttrick et al. |
| 2003/0205334 A1* | 11/2003 | Sherrill ............... B29C 33/0011 156/581 |
| 2005/0209735 A1* | 9/2005 | Groppe ................... B29C 70/32 700/245 |
| 2006/0090856 A1* | 5/2006 | Nelson .................. B29C 70/386 156/510 |
| 2006/0249868 A1 | 11/2006 | Brown et al. |
| 2007/0229805 A1 | 10/2007 | Engelbart et al. |
| 2009/0130450 A1* | 5/2009 | Anderson ............... B29C 70/38 428/411.1 |
| 2009/0261199 A1 | 10/2009 | McCarville et al. |
| 2009/0263618 A1 | 10/2009 | McCarville et al. |
| 2010/0024971 A1 | 2/2010 | Benson et al. |
| 2010/0102482 A1* | 4/2010 | Jones .................... B29C 33/307 264/320 |
| 2011/0097554 A1 | 4/2011 | Kehrl et al. |
| 2011/0303350 A1 | 12/2011 | Brown et al. |
| 2012/0006475 A1 | 1/2012 | Colombo et al. |
| 2012/0076973 A1 | 3/2012 | Guzman |
| 2012/0121866 A1 | 5/2012 | Hawkins et al. |
| 2013/0084434 A1 | 4/2013 | Kehrl et al. |
| 2013/0153154 A1 | 6/2013 | Boge et al. |
| 2014/0065354 A1 | 3/2014 | Smith, Jr. et al. |
| 2014/0190625 A1 | 7/2014 | Buttrick et al. |
| 2014/0338829 A1* | 11/2014 | Peng ................... B29C 63/0004 156/249 |
| 2016/0214330 A1 | 7/2016 | Buttrick et al. |
| 2020/0001551 A1 | 1/2020 | Anderson et al. |
| 2020/0039154 A1 | 2/2020 | Buttrick et al. |

OTHER PUBLICATIONS

Japanese Notice of Reasons for Rejection and English translation, dated Oct. 2, 2017, regarding Application No. 2015-551676, 9 pages.
Notice of Allowance, dated Dec. 15, 2015, regarding U.S. Appl. No. 13/901,813, 13 pages.
Office Action, dated Aug. 27, 2015, regarding U.S. Appl. No. 13/901,813, 27 pages.
International Preliminary Report on Patentability, dated Jul. 7, 2015, regarding Application No. PCT/US2013/071124, 7 pages.
International Search Report and Written Opinion, dated Feb. 21, 2014, regarding Application No. PCT/US2013/071124, 11 pages.
Kerhl et al., "Curved Composite Frames and Method of Making the Same," U.S. Appl. No. 13/684,988, filed Nov. 26, 2012, 64 pages.
Office Action, dated Mar. 7, 2019, regarding U.S. Appl. No. 15/089,399, 36 pages.
State Intellectual Property Office of China Report of Third Office Action and English translation, dated Jun. 26, 2017, Chinese Patent Application No. 201380069656.2, 16 pages.
State Intellectual Property Office of China Notification of the Decision of Rejection and English translation, dated Jan. 30, 2018, regarding Application No. 201380069656.2, 17 pages.
Japanese Notice of Reasons for Rejection and English translation, dated Jan. 30, 2018, regarding Application No. 2015-551676, 7 pages.

* cited by examiner

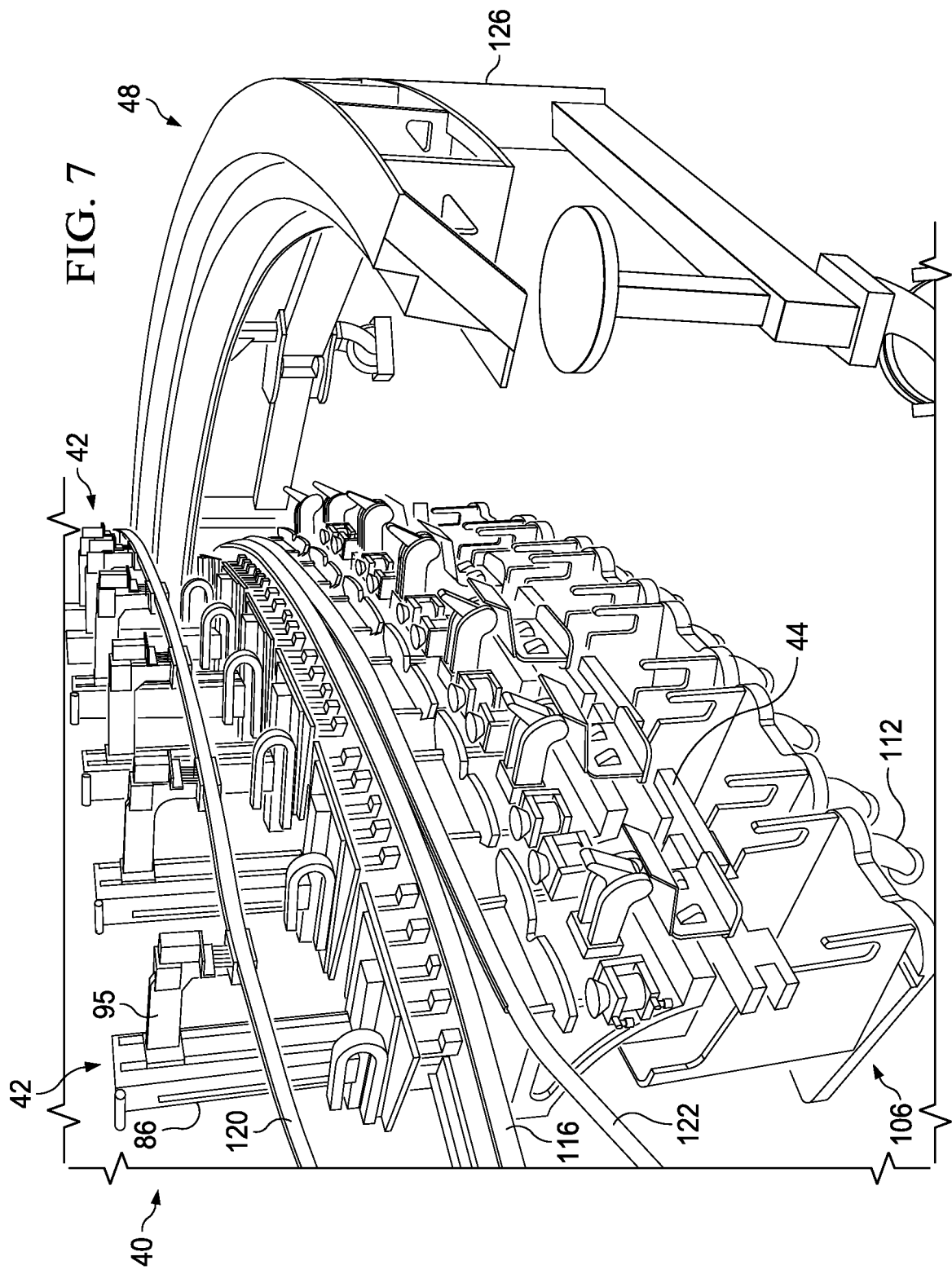

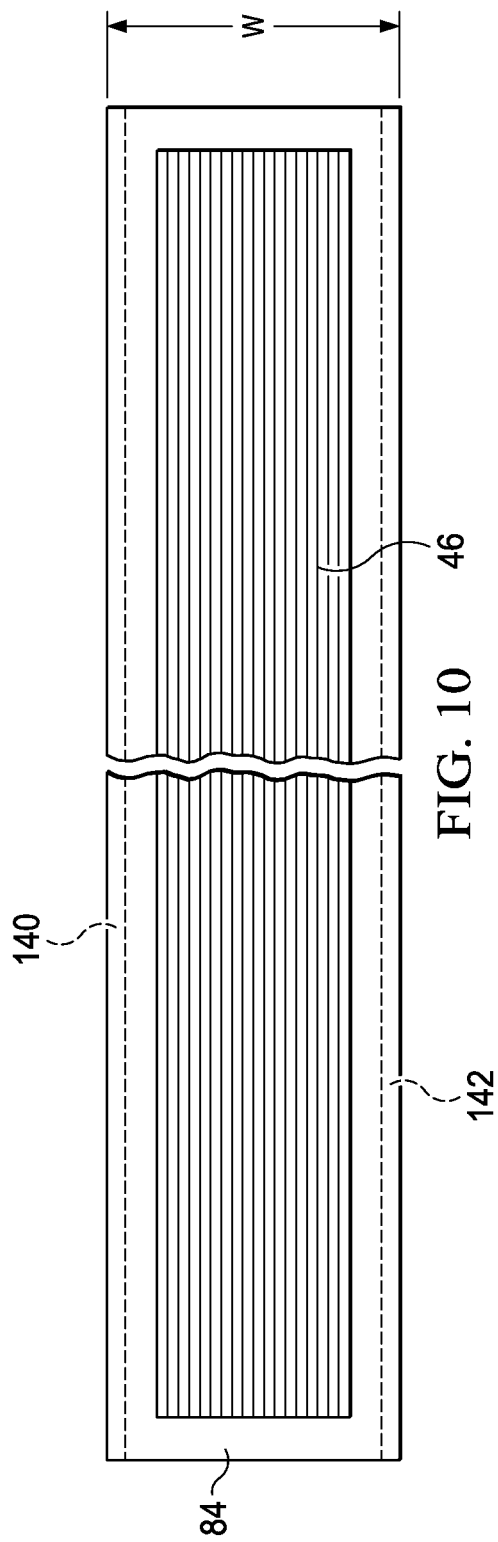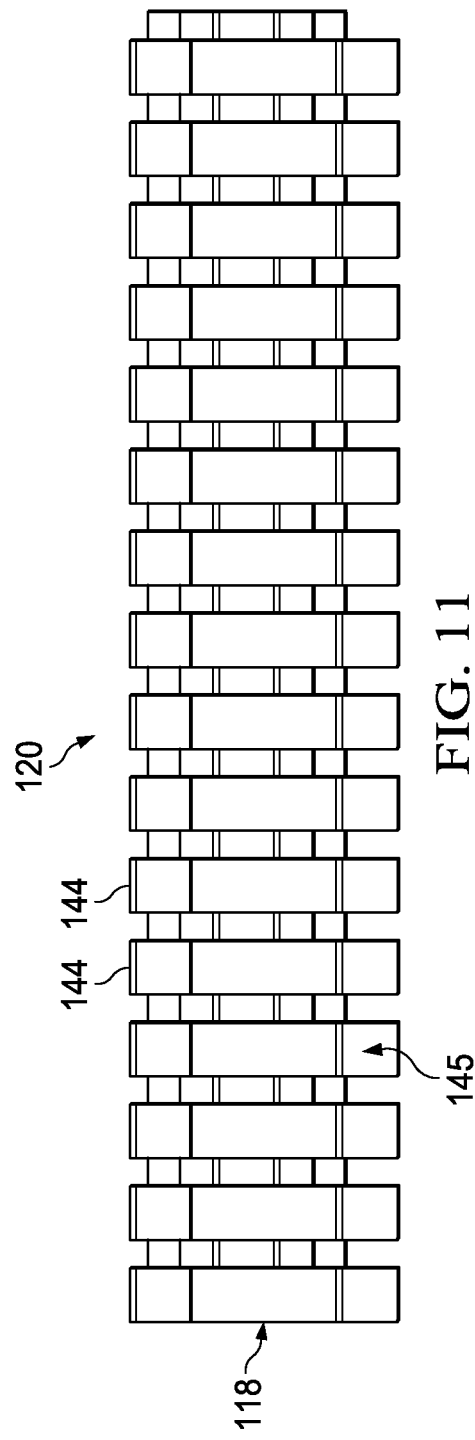

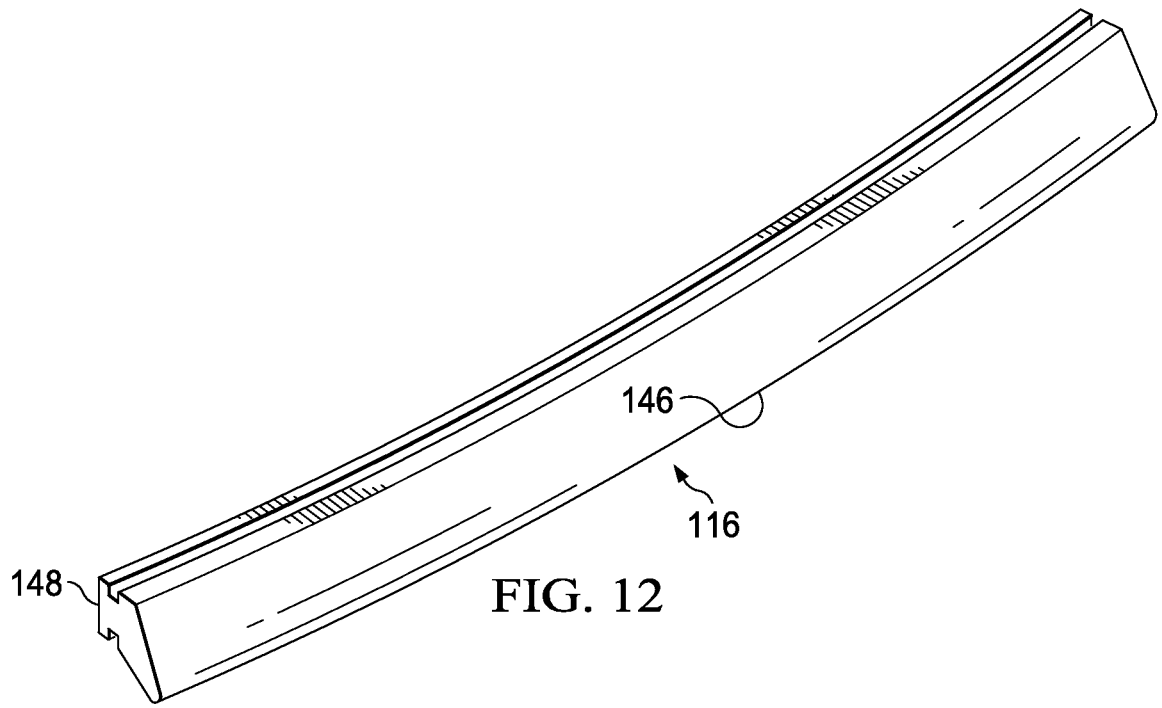
FIG. 12
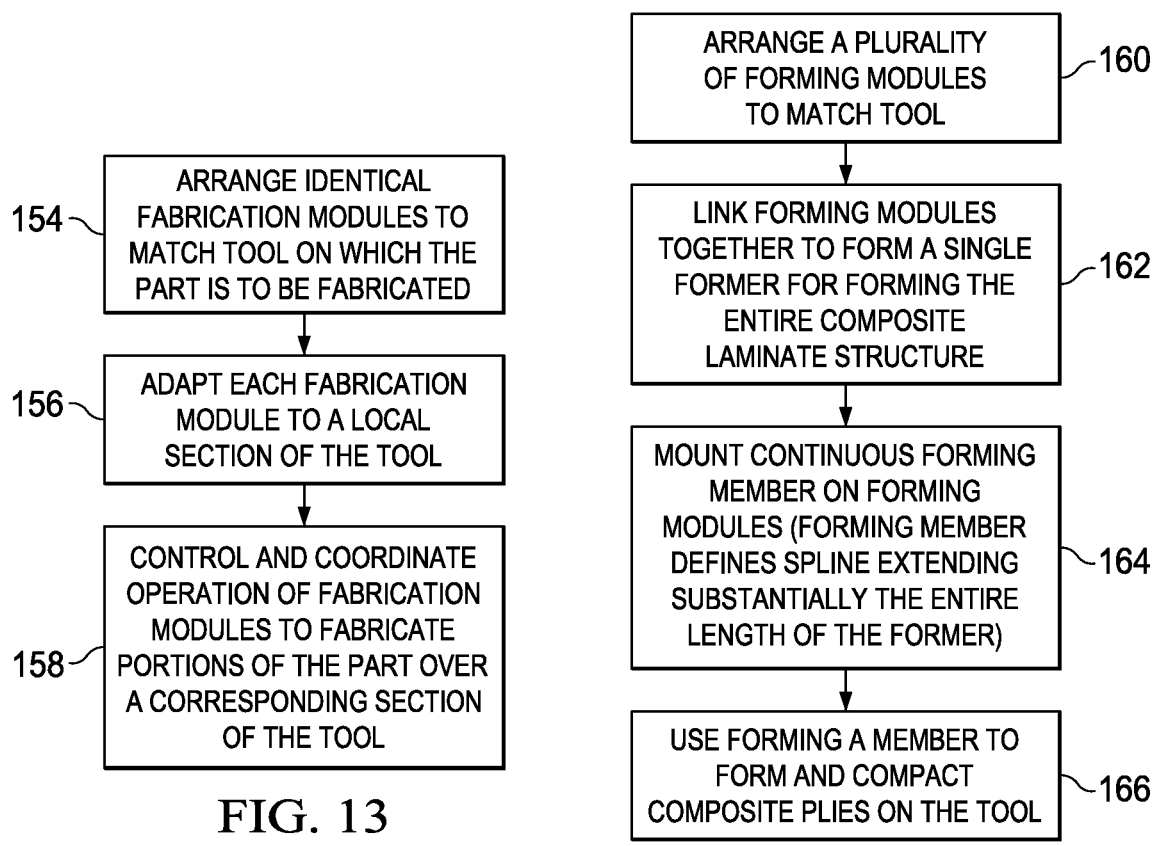
FIG. 13
FIG. 14

METHOD AND APPARATUS FOR FABRICATING CONTOURED LAMINATE STRUCTURES

CROSS REFERENCE TO RELATED APPLICATIONS

This application claims the benefit of Provisional U.S. Patent Application No. 61/749,881 filed Jan. 7, 2013, and Nonprovisional U.S. patent application Ser. No. 13/901,813 filed May 24, 2013, now U.S. Pat. No. 9,314,974 each of which applications is incorporated by reference herein in its entirety.

BACKGROUND INFORMATION

1. Field

The present disclosure generally relates to fabrication of laminates, especially those that are contoured.

2. Background

Composite structures, especially those having contours, sometimes have features that require that the structure be formed of multiple parts. For example, in the aircraft industry, contoured composite fuselage barrel frame sections may be formed using a two-piece assembly comprising a channel section frame and a shear tie, mechanically fastened together. More recently, one-piece composite frame sections have been proposed that employ braided composites, however this fabrication approach is time consuming and labor intensive, and may result in a frame that is heavier than desired. The problem of fabricating one-piece frame sections is more difficult in high production rate environments where production flow times may be important to achieve manufacturing efficiencies. In addition, forming and compacting highly contoured composite structures of the type mentioned above can be particularly challenging where the structure has section with tight radii of curvature, and/or highly localized variations in geometry.

Accordingly, there is a need for a method and apparatus for producing one-piece laminate structures, especially those that are contoured, which reduce labor and assembly time through automation. There is also a need for a method and apparatus for fabricating laminate structures using certain material forms such as unidirectional pre-preg tape, that may not be producible using conventional, manual fabrication methods, particularly those having tight radii of curvature and/or highly localized variations in geometry.

SUMMARY

The disclosed embodiments provide a method and apparatus for producing composite laminate structures that are contoured, particularly those that have tight radii of curvature and/or highly localized variations in geometry. The method is highly automated, thereby reducing labor costs, and reduces or eliminates part-to-part variations that may have an undesired effect on part performance. The apparatus includes a forming head that may be used as an end effector on existing types of manipulators such as an articulated arm robot. The forming head includes a compliant nosepiece that may be reconfigured to match local contours or changes in geometry of a contoured layup tool.

According to one disclosed embodiment, apparatus is provided for forming composite plies on a contoured tool. The apparatus comprises a manipulator, and a forming head mounted on the manipulator. The forming head is used form the composite plies on the contoured tool, and includes a compliant nosepiece adapted to conform to the contoured tool. The manipulator may be an articulated arm robot having the forming head mounted thereon. The forming head includes a plurality of actuators coupled with the compliant nosepiece for configuring the nosepiece to match contours on the tool. The forming head may include a support bracket adapted to be coupled with the manipulator. The compliant nosepiece and the plurality of actuators are carried on the support bracket. The forming head may also include a flexible track coupled with each of the actuators, and the compliant nosepiece is mounted on the flexible track. Each of the actuators may be a pneumatic cylinder having an actuator rod connected with the flexible track.

According to another disclosed embodiment, an end effector is provided for forming composite plies on a tool having a contour. A compliant nosepiece is configured to form the composite plies onto the tool, and a plurality of actuators are coupled with the compliant nosepiece for applying a compaction force to the compliant nosepiece. The actuators are configured to respectively displace corresponding sections of the compliant nosepiece. The end effector may further include a flexible track, wherein the compliant nosepiece is mounted on the flexible track and the flexible track is coupled with each of the actuators. The effector may also include a bracket adapted to be coupled with a manipulator, and a mounting block attached to the bracket, wherein the actuators are mounted on the mounting block. A plurality of track holders are respectively pivotally connected with the actuators for holding the track. Each of the actuators includes a displaceable actuator rod, and the track holders are respectively attached to the displaceable actuator rods. The actuators are arranged in an arc generally matching the contour of the tool.

According to still another disclosed embodiment, a method is provided of forming a composite ply on a tool having contours. A forming head is mounted on an automatically controlled manipulator. The manipulator moves the forming head to each of a plurality of sections along the tool. A composite ply is formed onto the tool at each of the sections along the tool, and the automatically controlled manipulator is used to apply a compaction pressure to the ply. Moving the forming head may be performed by a robotic arm. Forming the composite ply on the tool includes configuring a forming member to substantially match the contours of the tool. The forming member may be performed using a plurality of actuators. Moving the forming head is performed by the automatically controlled manipulator.

According to a further embodiment, a method is provided of forming a composite ply on a contoured tool. A forming head is brought into proximity with a location on the contoured tool using a robotic arm. A forming member on the forming head is configured to substantially match a contour on the tool using a plurality of actuators to displace the forming member. A ply is positioned adjacent the tool and the forming member is brought into contact with the tool and swept over the tool using the robotic arm. The robotic arm is used to apply a forming pressure to the composite ply as the forming member is moved over the tool. The actuators may also be employed to apply forming pressure to the ply.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 7 is an illustration of a perspective view of the apparatus, prior to being moved into proximity to and clamped to a tool, a ply carrier not shown for clarity.

FIG. 10 is an illustration of a plan view of a ply carrier having a ply mounted thereon.

FIG. 11 is an illustration of a front view of a nosepiece track forming part of each of the fabrication modules shown in FIGS. 7-9.

FIG. 12 is an illustration of a perspective view of a portion of the length of a nosepiece adapted to be mounted on the nosepiece track shown in FIG. 11.

FIG. 13 is an illustration of a flow diagram of a method of fabricating each of a plurality of different parts in a family of parts having common features.

FIG. 14 is an illustration of a flow diagram of a method of fabricating a composite laminate structure.

DETAILED DESCRIPTION

Figure 1:
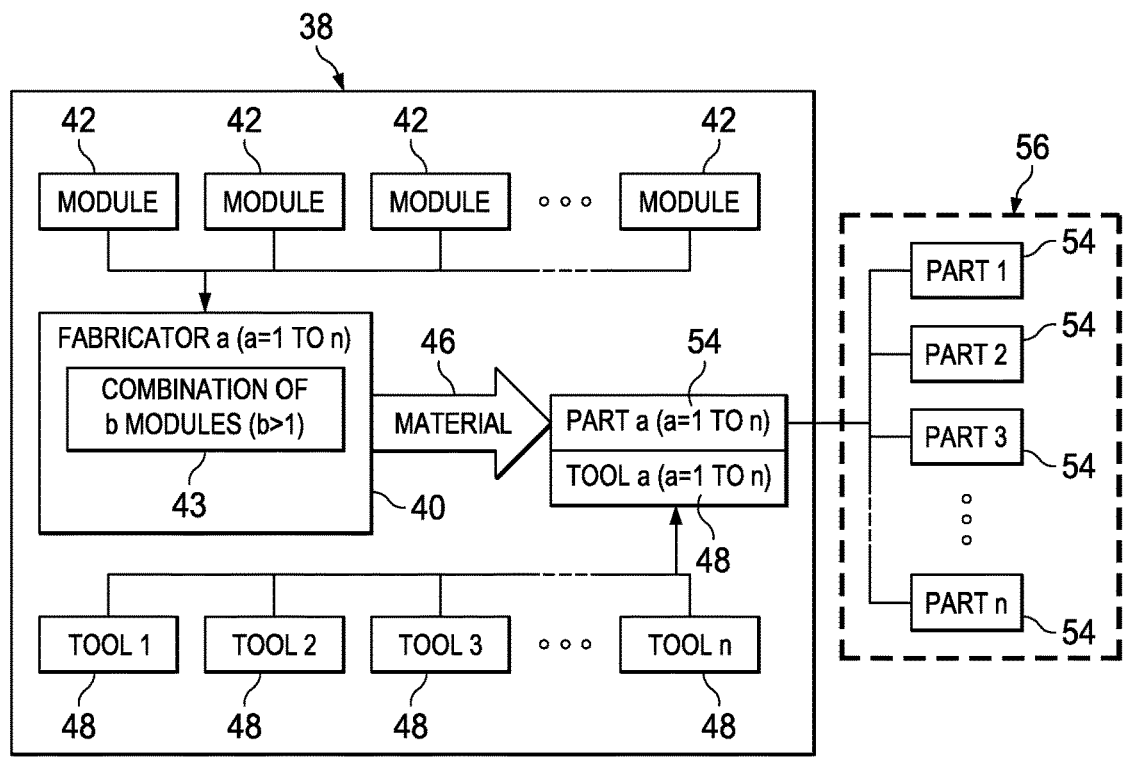
FIG. 1 is an illustration of a block diagram of a system for fabricating any of a plurality of parts within a family having common features using corresponding tools and fabrication modules according to the disclosed embodiments.

Referring first to FIG. 1, a system 38 is provided for fabricating any of a plurality of unique parts 54 within a family 56 of parts 54 having common features or characteristics. The unique parts 54 may be fabricated using corresponding, unique tools 48, which may be layup tools, and a combination 43 of fabrication modules 42 arranged and configured to form a fabricator 40, sometimes hereinafter also referred to as a former or a forming head 40. As will be discussed below in more detail, the fabrication modules 42 may be identical and interchangeable. The number and arrangement of the fabrication modules 42 is matched to the particular tool required to fabricate a particular part 54. The fabricator 40 fabricates the part 54 by placing and forming material 46 on the particular tool 48. In one application, the part 54 may be a multi-ply composite laminate, and the material 46 may be a carbon fiber reinforced plastic (CFRP).

Figure 2:
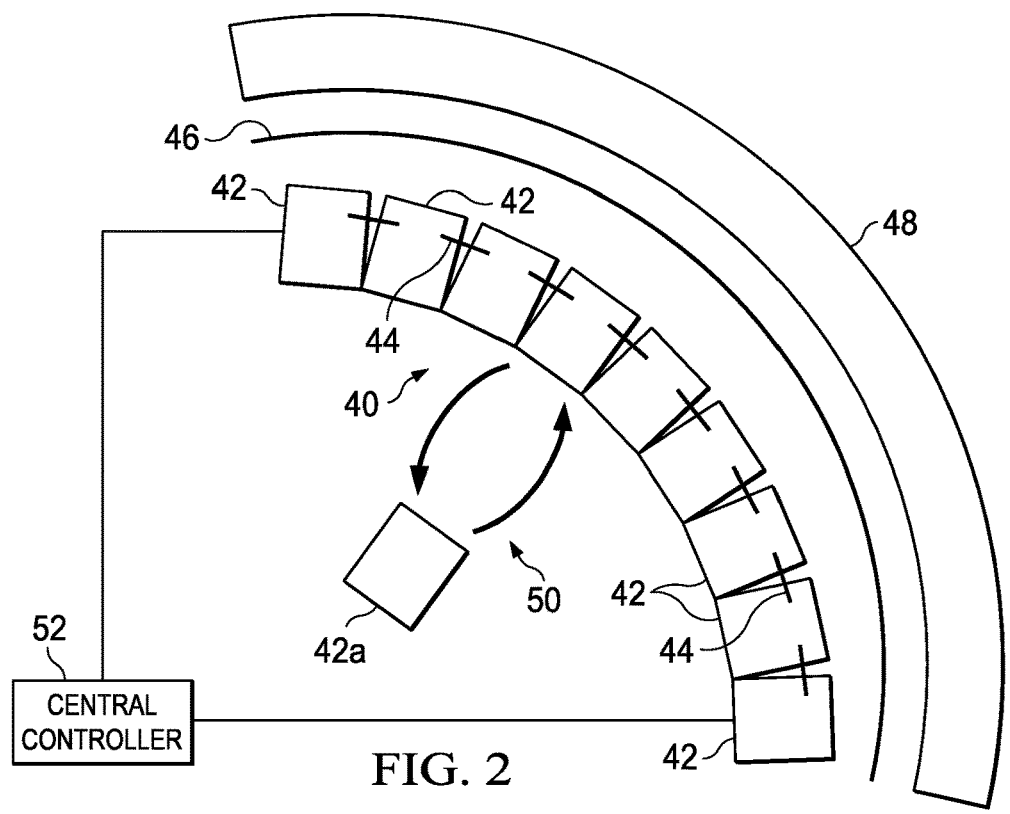
FIG. 2 is an illustration of a diagrammatic plan view of apparatus for fabricating contoured composite laminate structures.

Attention is now directed to FIG. 2 which illustrates one embodiment of the system 38 shown in FIG. 1. In this example, a plurality of former modules 42 are arranged in a configuration generally matching the shape of a layup tool 48 on which a particular part (not shown in FIG. 2) is to be formed. In the illustrated example, the former modules 42 are arranged in an arc shape that substantially matches the arc shaped layup tool 48, however, a variety of other shapes are possible. The former 40 forms and laminates composite plies 46 on the tool 48. The former modules 42 are rigidly connected with each other by linkage 44 to form a former 40. The former 40 self-adapts and aligns itself to each particular tool 48 required to make a particular part 54 (FIG. 1). The former modules 42 may be substantially identical to each other and are thus interchangeable 50 with modules 42a purposes of repair, replacement or reconfiguration of the former 40 to form unique parts within a family of parts having common features or characteristics. Each of the former modules 42 is coupled with a central controller 52 which may comprise a special or general purpose computer, or a PLC (programmable logic controller). The central controller 52 controls and coordinates the automated operation of the former modules 42.

As previously mentioned, the former 40 may be used to form a variety of composite parts within a family of parts having common features or characteristics. For example, referring to FIGS. 3 and 4, the former 40 may be used to form and laminate a composite frame section 58 used in an aircraft fuselage (not shown). The frame section 58 is curved or contoured along its length and has a radius "R". The former 40 may be used to form any of a range of frame sections 58 having different arc lengths, radii or other common features within a family of frame sections 58. These features, including contours or radii, may be continuous or non-continuous along the length of the frame section 58 or other parts being formed. The frame section 58 is generally Z-shaped in cross section, and comprises an inner chord flange 62 and an outer chord flange 64 (sometimes also referred to as a shear tie 64). The inner and outer chord flanges 62, 64 respectively are connected by a central web 60. The shear tie 64 is connected to the web 60 by a shear tie radius 68, and the inner chord flange 62 is connected to the web 60 by an inner chord radius 70. While a Z-shaped frame section 58 has been illustrated in the exemplary embodiment, it should be noted that the disclosed method and apparatus may be employed to fabricate composite laminate parts having a variety of other cross-sectional shapes, including but not limited to L, I and C cross-sectional shapes.

Figure 5:
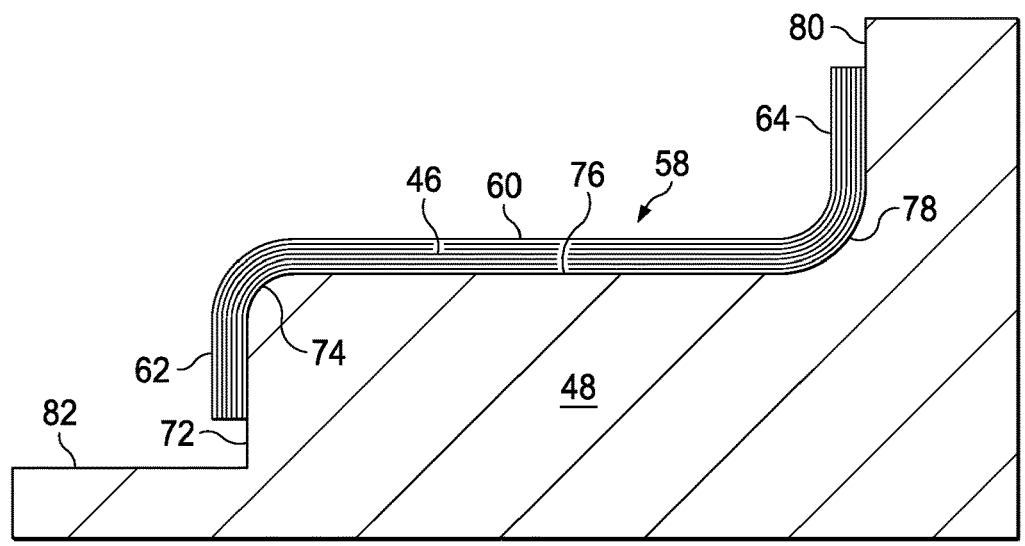
FIG. 5 is an illustration of an end view of a tool having the frame section shown in FIGS. 3 and 4 laid up and compacted thereon.

Referring now to FIG. 5, the former 40 forms and laminates composite pre-preg plies 46 on a tool 48. The tool 48 has tool features matching the frame section 58. In this example, the tool 48 includes an inner chord tool flange 72, an inner chord tool radius 74, a tool web 76, shear tie tool radius 78 and an outer chord tool flange 80. The tool 48 also includes a clamping flange 82 extending around its entire inner chord. Other types of layup tools 48 may be used in connection with the disclosed method and apparatus to form other types and sizes composite laminate parts, having cross-sectional shapes other than Z cross-sections. Moreover, the illustrated tool 48 may be employed to layup a curved composite laminate frame section or other part having an L-shaped cross-section.

Figure 6:
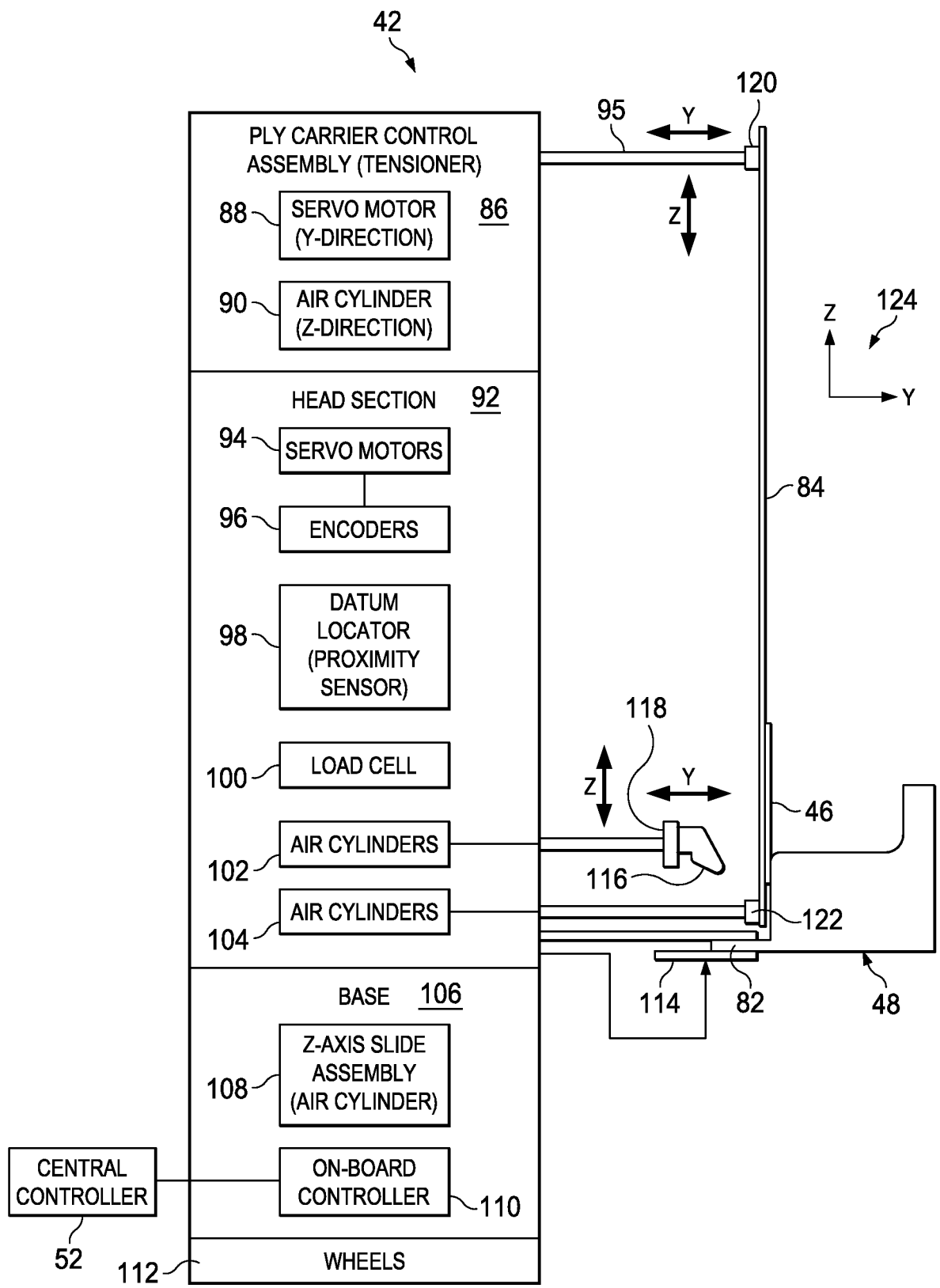
FIG. 6 is an illustration of a functional block diagram of the apparatus of FIG. 2, shown clamped to the tool illustrated in FIG. 5.

Attention is now directed to FIGS. 6-9 which illustrate one embodiment of the former 40. FIG. 6 is a functional block diagram showing one of the former modules 42, in the process of laying up a single pre-preg ply 46 on the tool 48. The ply 46 is supported in a desired, or indexed position on a ply carrier 84 discussed below in more detail. The ply carrier 84 is held along its upper edge on a carrier track 120 at the end of a support arm 95 forming part of the former module 42. The former module 42 broadly comprises a ply carrier control assembly 86 mounted on a head section 92 which is supported on a movable base 106. The base 106 may include an on-board controller 110 that is coupled with the central controller 52 (FIG. 2) previously discussed. Wheels or casters 112 on the base 106 allow the former module 42 to be moved along a supporting surface such as a factory floor (not shown) in any direction in order to allow the former module 42 to be positioned in a desired configuration with other former modules 42, such that the collective geometry of the former modules 42 substantially matches that of the tool 48. The base 106 includes a Z-axis slide assembly 108 which moves the head section 92 and the ply carrier control assembly 86 in the vertical direction, or Z-axis within a machine coordinate system 124.

The ply carrier control assembly 86 controls the attitude of, and tension on the ply carrier 84 in order to support and continuously reposition position the ply 46 as it is being formed onto the tool 48. The ply carrier control assembly 86 may include a motorized drive system which moves the support arm 95 and thus the carrier support track 120 along both the Y and Z axes. For example, the motorized drive system may comprise a servo-motor 88 for driving the carrier support track 120 along the Y axis, and an air cylinder 90 for driving the support arm 95 and the carrier support track 120 along the Z axis. Other drive arrangements are possible.

The head section 92 includes a ply forming member, referred to hereinafter as a nosepiece 116, which engages the ply carrier 84 and follows the shape of the tool 48 to form and compact the ply 46 onto the tool 48. The nosepiece 116 is removably mounted in a nosepiece track 118 discussed later in more detail. The nosepiece 116 extends continuously along the entire arc length of the tool 48, and effectively forms a spline between the forming modules 42. Both the nosepiece 116 and the track 118 may be flexible along their length to conform to the curvature and other features of the tool 48. The nosepiece track 118 is coupled with a motorized drive system which may comprise, for example and without limitation, a plurality of air cylinders 102 which move the nosepiece 116 in the Y direction.

Movement of the nosepiece 116 in the Z direction may be effected through movement of the head section 92 by the Z-axis slide assembly 108 on the base 106. The head section 92 further includes an inner chord clamp 122 driven in the Y direction by air cylinders 104 or similar motor drives. The inner chord clamp 122 clamps the lower edge of the ply carrier 84 and the ply 46 against the inner chord tool flange 72 (FIG. 5) while the ply 46 is being formed over other surfaces of the tool 48. The head section 92 may include a datum locator which may comprise, for example and without limitation, a proximity sensor, as well as servo-motors 94 and encoders 96. The servo-motors 94 and the encoders 96 may be used to determine the position of the nosepiece 116, and thus the location of surfaces on the tool 48, during an adaptive tool learning process discussed below. One or more load cells 100 on the head section 92 may be used to sense the amount of force being applied by the nosepiece 116 during both the learning and ply forming processes.

As can be appreciated from the foregoing description, the former 40 provides 2-axis (Y-Z) controlled sweeping of pre-preg plies with 2-axis coordinated motion. However, motion is not limited to 2 axes. For example, the required motion may be accomplished using multiple robots (not shown) operating in unison. The adaptive control employed by former 40 allows the former 42 to adapt to each particular tool 48 used to make any of a number of parts within a family of parts, by using a generic profile of the parts in the family, and force feedback to learn and follow the specific tool and part geometry. The adaptive control used by the former 40 also automatically adapts or adjusts to the shape of the part 54 as the thickness of the part 54 increases with layup of each successive ply 46. The use of a combination of position control and motor torque feedback allow constant pressure to be applied by the nosepiece 116 to the part 54 during the forming process.

Figure 9:
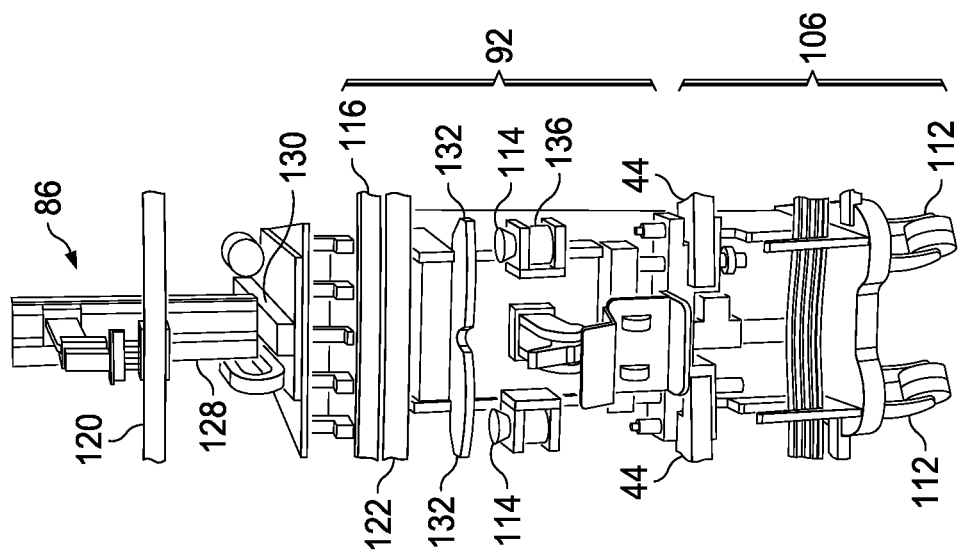
FIG. 9 is an illustration of a front perspective view of one of the fabrication modules shown in FIG. 8, depicting additional details of the module.
Figure 8:
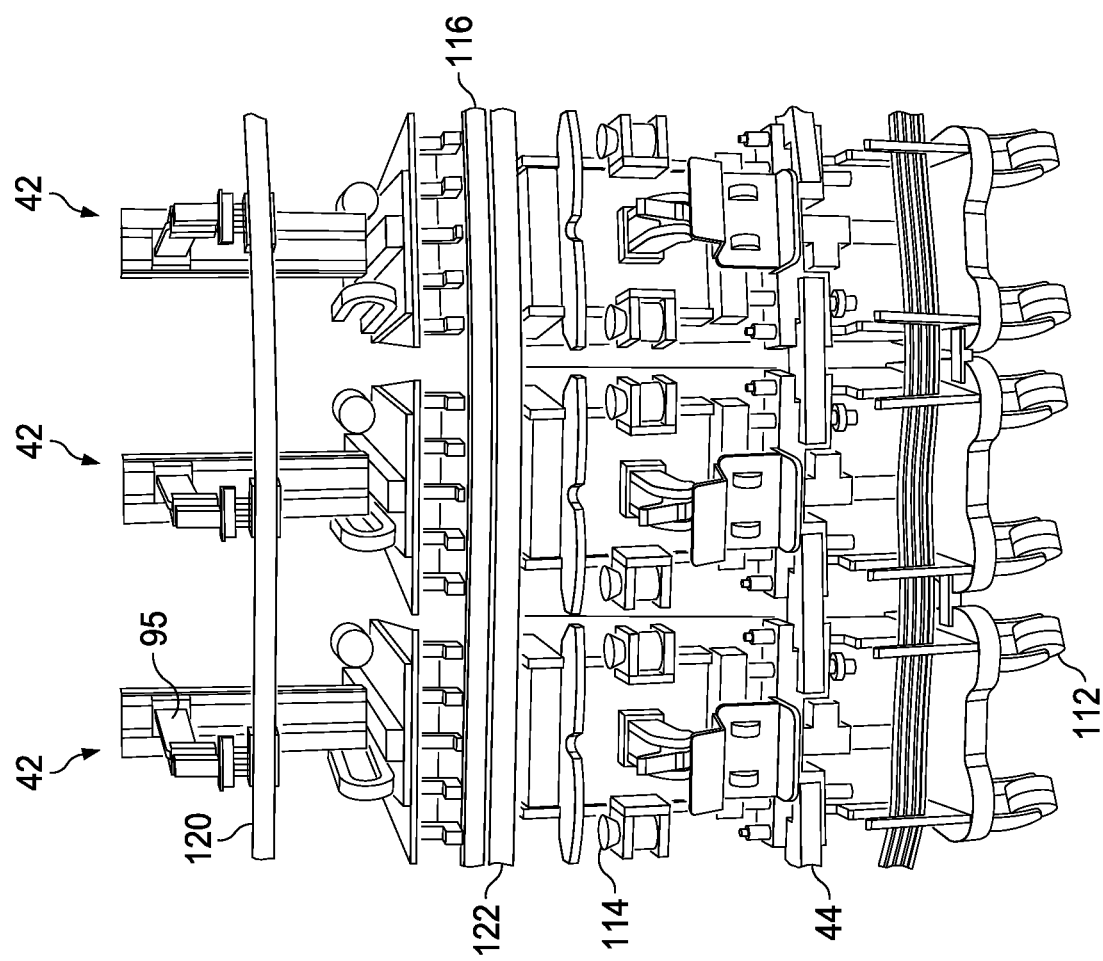
FIG. 8 is an illustration of a front perspective view of three adjacent fabrication modules forming part of the apparatus shown in FIG. 7.

As shown in FIG. 7, the tool 48 may be supported on a wheeled cart 126 for movement into proximity with a former 40 comprising a plurality of former modules 42 that have been configured to substantially match the geometry of the tool 48. The former modules 42 are rigidly connected together by mechanical linkages 44 (see FIG. 8) between bases 106 of adjacent former modules 42. Referring particularly to FIG. 9, the ply carrier control assembly 86 (FIG. 6) includes a Z-axis slide support allowing movement of the support arm 95 (see FIGS. 6-8) along the Z axis, and a slide 130 providing movement of the support arm 95 along the Y-axis. Tool clamps 114 driven by air cylinders 136 function to clamp the flange 82 (FIG. 5) of the tool 48 against an index plate 132 which establishes a common "waterline" or reference datum, for all of the former modules 42, automatically aligning all of the former modules 42 relative to the tool 48. Each of the former modules 42 includes a slight amount of "float" that allows each of the head sections 92 to align to the tool waterline and then lock into position. As a result of this feature, the tool 48 does not have to be located on a precise platform, and the forming process can be carried out on standard factory floors that may be uneven. Although not shown in the drawings, the tool 48 and/or the plies 46 may be heated during a layup process in order to soften the resin and facilitate forming. Heating may be achieved using any suitable technique, including but not limited to infrared radiation using IR heat lamps.

Referring to FIG. 10, the ply carrier 84 may be formed of a flexible, durable material that may be stretchable in one or more directions, for example along its width "W". One or more plies 46 may be placed in preselected, indexed positions on the ply carrier 84 prior to the ply carrier 84 being loaded onto the former 40. The ply carrier 84 may include upper and lower carrier guides 140, 142 that are used to removably mount the ply carrier on the former 40. For example, the upper carrier guide 140 may include individual guide members (not shown) on the back of the ply carrier 84 which are received within a groove (not shown) in the carrier support track 120. Similarly, the lower carrier guide 142 may comprise a continuous guide strip (not shown) on the back of the ply carrier 84 which is received within a groove (not shown) extending along the inner chord clamp 122.

FIG. 11 illustrates further details of one embodiment of the nosepiece track 120. In this example, the nosepiece track 120 comprises a plurality of spaced apart segments 144 which allow the track 120 to flex as required to permit the nosepiece 116 to conform to features of the tool 48. As shown in FIG. 12, the nosepiece 116 includes an outer forming tip 146 that has a profile suited for the particular application and features of the tool 48. The nosepiece 116 is mounted on the nosepiece track 120 by a T-shaped guide 148 that is slidably received within a groove 145 in the nosepiece track 120. The nosepiece 116 may be removably installed in the nosepiece track 120 by sliding it lengthwise through the groove 145. Thus, nosepieces 116 having different sizes and shapes are interchangeable, allowing selection of a nosepiece 116 that is suitable for the application and tool shape. The nosepiece 116 may be compliant in order to better conform it to features of the tool 48 during the forming process.

FIG. 13 broadly illustrates the steps of a method of fabricating each of the plurality of differing parts 54 in a family 56 of parts 54 having common features, wherein each of the parts 54 is fabricated using a unique tool 48. Beginning at 154, identical fabrication modules 42 are arranged to match a tool 48 in which the part 54 to be fabricated. At 156, each of the fabrication modules 42 is adapted to a local section of the tool 48. At 158, operation of the fabrication modules 42 is controlled and coordinated to fabricate portions of the part 54 over a corresponding section of the tool 48.

FIG. 14 broadly illustrates the steps of a method of fabricating a composite laminate structure 54. Beginning at 160, a plurality of forming modules 42 are arranged to match a tool 48 on which the structure 54 is to be formed. At 162, 40 the modules 42 are linked together to form a single former 40 for forming the entire composite laminate structure 54. At 164, a continuous forming member 116 is mounted on the forming modules 42. The forming member 116 defines a spline extending substantially the entire length of the former 40. At 166, the forming member 116 is used to form and compact composite plies 46 on the tool 48.

Figure 15:
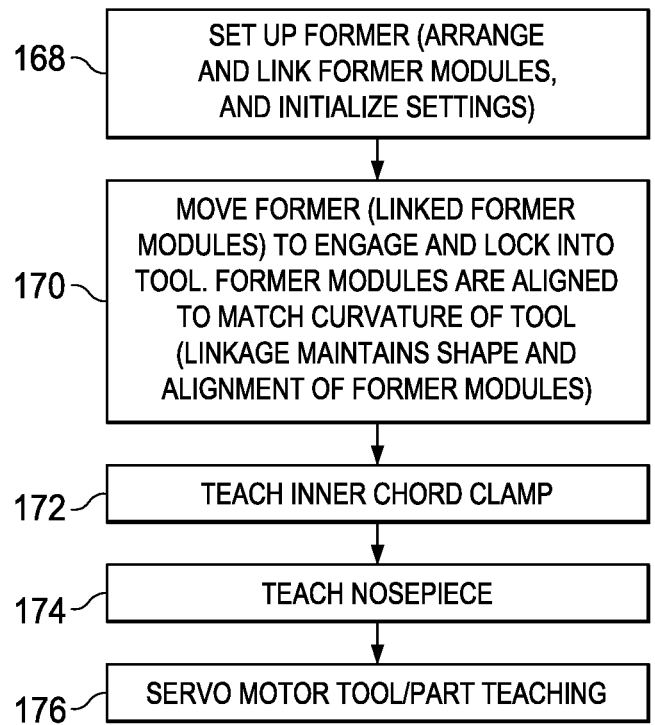
FIG. 15 is an illustration of a flow diagram of the method used to set up and teach each of the fabrication modules.

Attention is now directed to FIG. 15 which broadly illustrates the steps that may be carried out to set up and teach each of the forming modules 42 in preparation for a forming process using a particular tool 48. At 168, former 40 is set up by arranging and linking former modules 42 together using linkages 44, and initializing settings of each of the modules 42. Then, at 170, the linked former modules 42 are moved to engage and lock onto the tool 48. The tool clamps 114 (FIG. 9) clamp the flange 82 (FIG. 5) of the tool 48 against the tool waterline index plate 132. The former modules 42 are aligned to match the curvature of the tool 48, and the linkage 44 maintains the shape and alignment of the former modules 42. At 172, the former module 42 is taught the position of the inner chord clamp relative to the tool 48, and at 174 the position of the nosepiece relative to the tool 48 is learned. At 176, the servo-motors 94 (FIG. 6) and the encoders 96 are used to initially learn the shape of the tool, and then to relearn the surface of the laminated plies 46 as each of the plies 46 is laid up.

Figure 16:
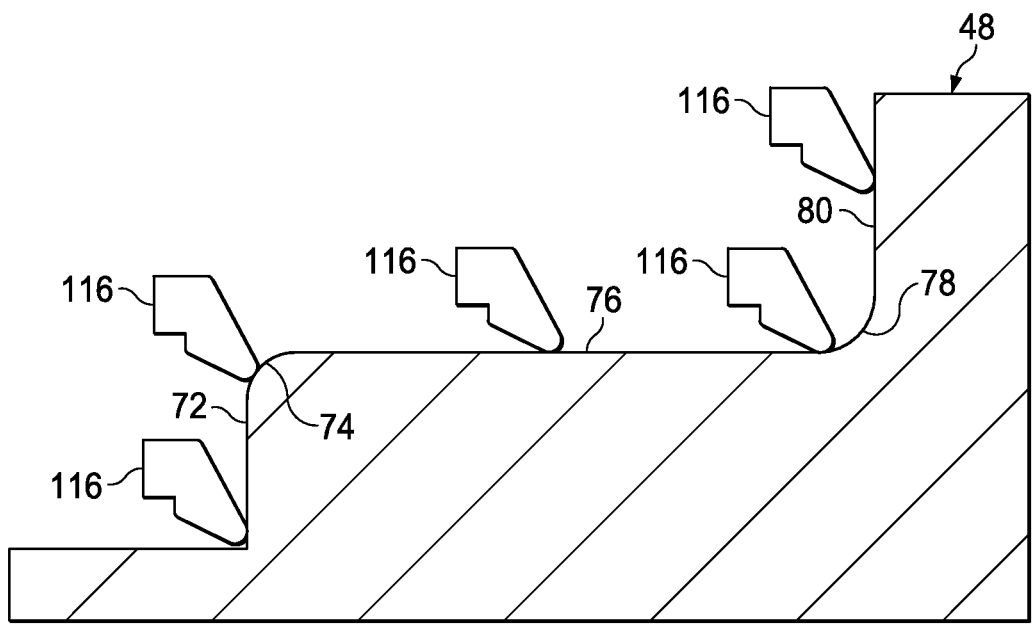
FIG. 16 is an end view of the tool shown in FIG. 5, illustrating the progressive movement of the nosepiece during the set up and teaching phase shown in FIG. 15.
Figure 17:
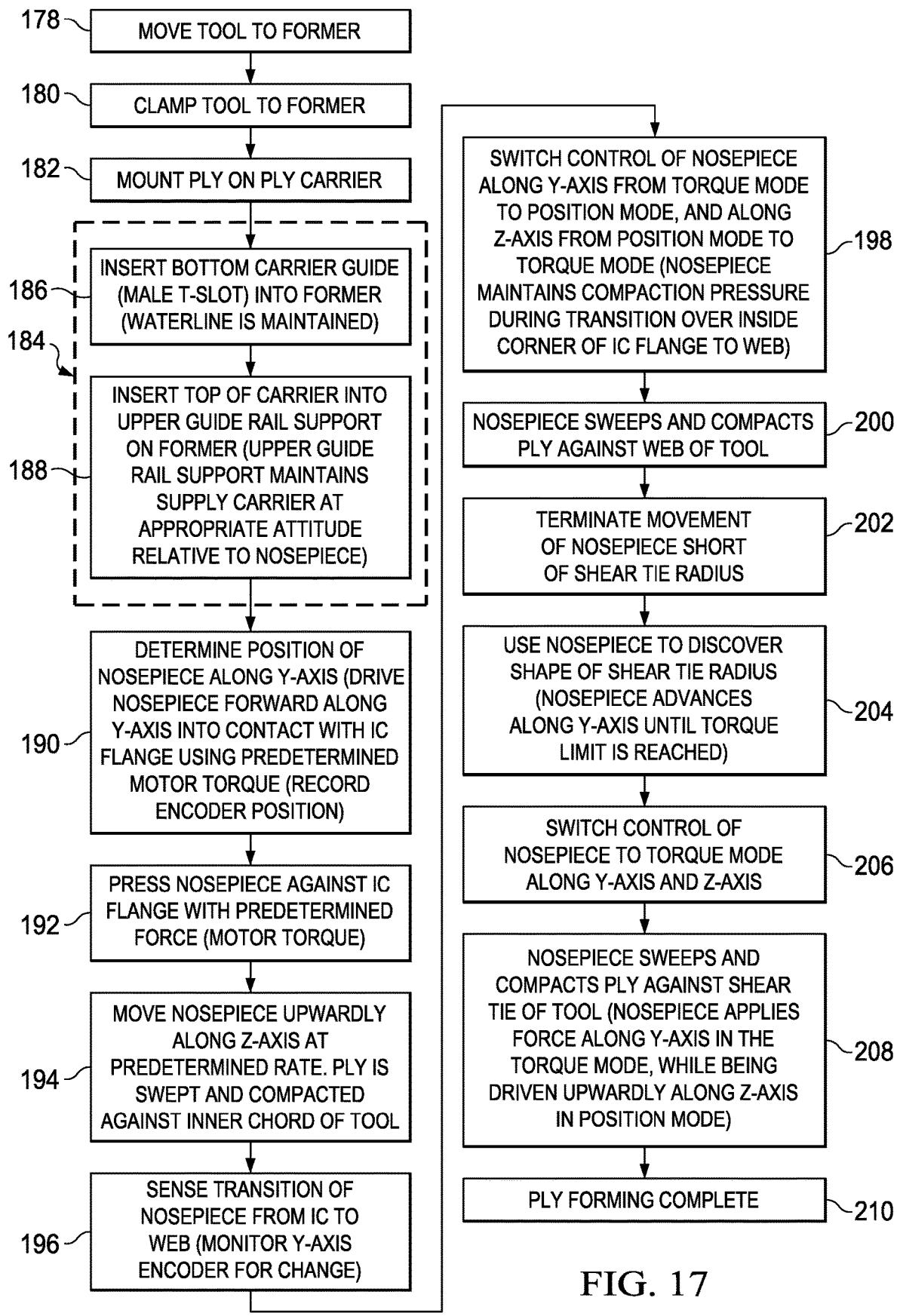
FIG. 17 is illustration of a flow diagram of an adaptive control method employed by each of the fabrication modules.

Attention is now directed to FIGS. 16 and 17 which illustrate additional details of the disclosed forming method. Beginning at 178 (FIG. 17), the tool 48 is moved into proximity to the former 40, and at 180, the tool 48 is clamped to the former 40. At 182, one or more plies 46 are mounted on the ply carrier 84. At 184, the ply carrier 84 having the ply 46 mounted thereon is loaded onto the former 40. This loading process is performed by inserting the bottom carrier guide 142 into the former at 186, and at step 188, inserting the top guide 140 into the upper guide rail track 120 on the former 40. At 190, the position of the nosepiece 116 along the Y-axis is determined by driving the nosepiece 116 forward along the Y-axis into contact with the inner chord flange 72 using a predetermined motor torque. An encoder 96 coupled with the servo-motor 94 is read to indicate the position of the nosepiece 116. At 192, the nosepiece 116 is pressed against the inner chord flange with a predetermined amount of force. At 194, the nosepiece 116 is moved upwardly along the Z-axis at a predetermined rate. The ply 46 is swept and compacted against the inner chord tool surface 72, at step 194.

At 196, the transition of the nosepiece 116 from the inner chord tool surface 72 to the web tool surface 76 is sensed by monitoring a Y-axis encoder 96 for a change. At 198 control of the nosepiece 116 along the Y-axis is switched from a torque mode to a position mode, and along the Z-axis from a position mode to a torque mode. The nosepiece 116 maintains compaction pressure against the ply 46 during the transition over the inside corner 74 of the inner chord to web radius. At 200, the nosepiece 116 sweeps and compacts the ply against the web tool surface 76 on the tool 48. At 202, movement of the nosepiece 116 is terminated when the nosepiece 116 is a short distance from the shear tie radius 78. At 204, the nosepiece 116 is used to "discover" the shape of the shear tie radius 78. This is accomplished by advancing the nosepiece 116 along the Y-axis until a preselected torque limit is reached. At step 206, control of the nosepiece 116 is switched to the torque mode along the Y-axis and along the Z-axis. At 208, the nosepiece 116 sweeps and compacts apply against the shear tie tool surface 80. During this step, the nosepiece 116 applies force along the Y-axis in the torque mode, while being driven upwardly along the Z-axis in the position mode. At step 210 the ply forming process is complete and steps 182-208 may be repeated to layup, form and compact additional plies.

Figure 18:
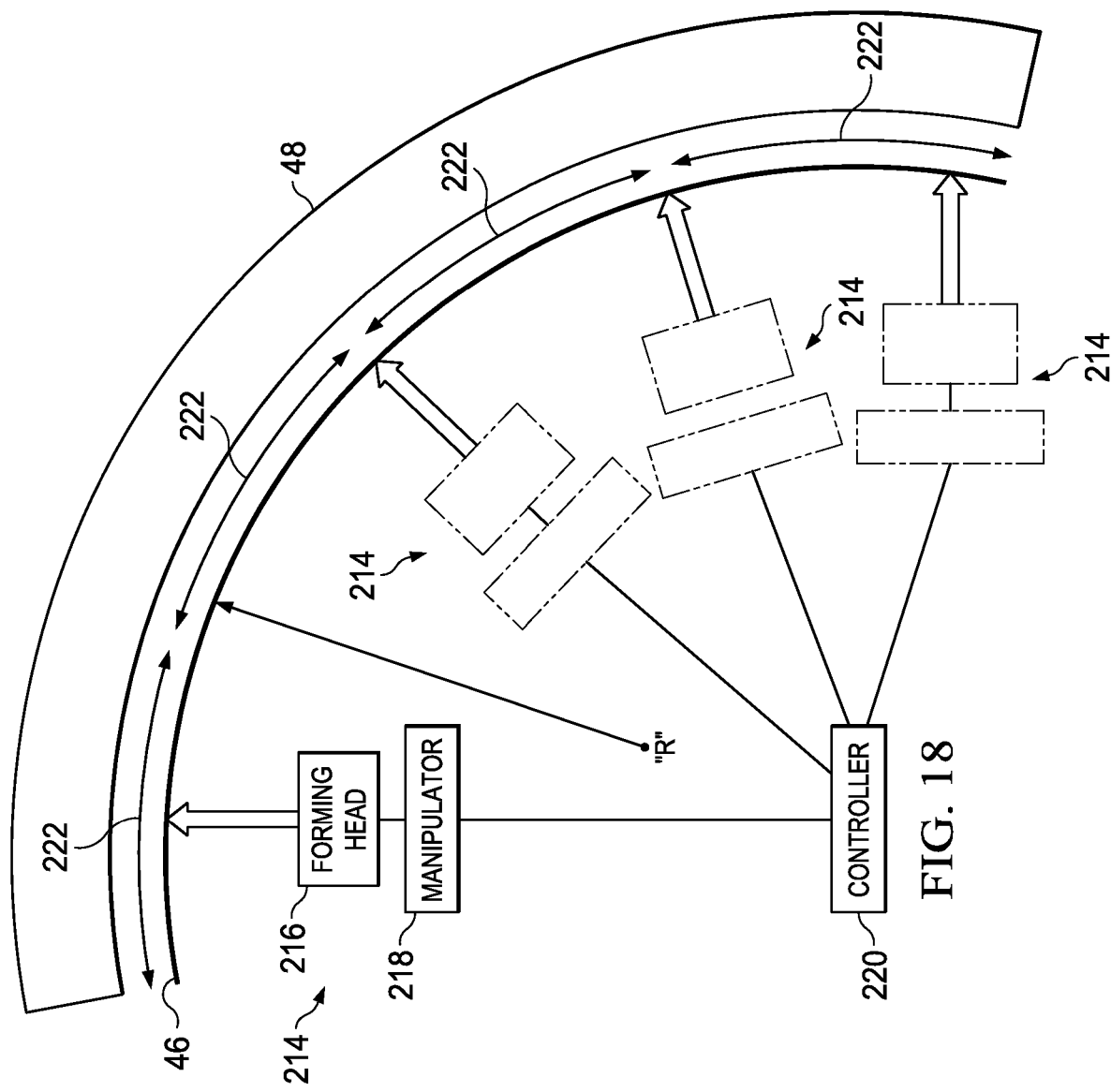
FIG. 18 is an illustration of a combined block and diagrammatic plan view of apparatus for forming a contoured composite laminate having tight radii of curvature, successive positions of a forming head indicated in broken lines.

In some applications, the composite laminate structure to be formed may have tight radii of curvature or other localized geometries or features that may be difficult to form, or to fully compact on the tool using the apparatus previously described in connection with FIGS. 1-17. In such applications, an alternate embodiment of a forming head 214 described below in connection with FIGS. 18-28 may be employed to form and compact the plies on the tool. Referring particularly now to FIG. 18, the forming head 214 comprises a forming head 216 mounted on an automatically controlled manipulator 218. The manipulator 218 may comprise any suitable automatically controlled device such as a gantry assembly or an articulated arm robot operated by a programmed controller 220. The controller 220 may comprise a general purpose computer such as a PC, or a special purpose computer such as a PLC (programmable logic controller). The forming head 214 is capable of the forming and compacting local sections 22 of one or more composite plies 46 on a contoured tool 48 which may have tight radii of curvature "R", or other features on which it may be difficult to form and compact the composite ply 46.

Figure 3:
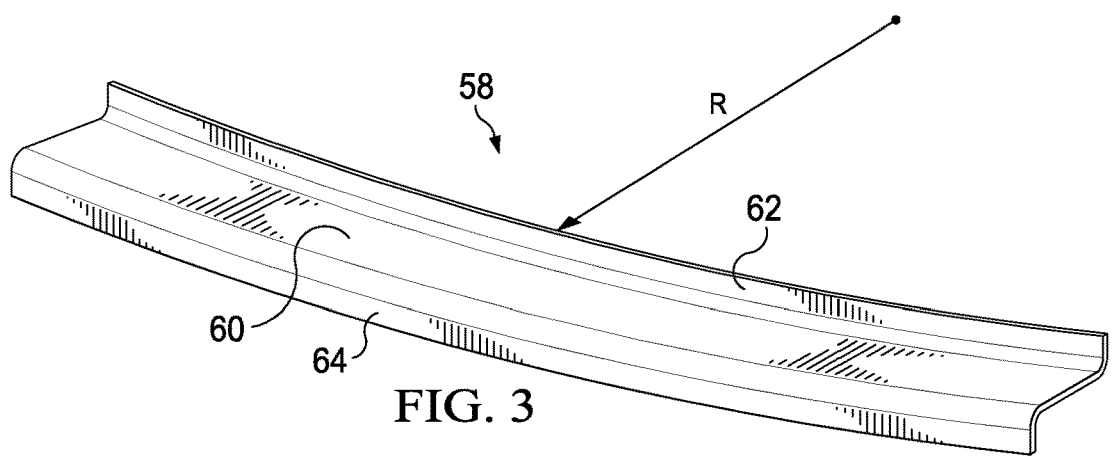
FIG. 3 is an illustration of a perspective view of a composite laminate frame section having a Z-shaped cross-section.
Figure 4:
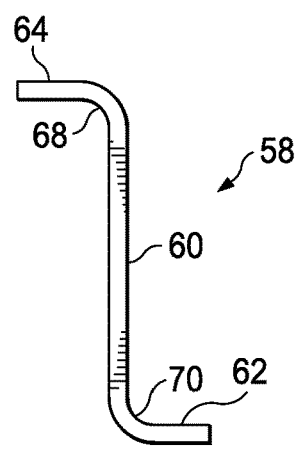
FIG. 4 is an illustration of a cross-sectional view of the frame section shown in FIG. 3.

In the illustrated embodiment, the tool 48 is a contoured tool similar to that previously described in connection with FIG. 2, and is configured to form frame sections of an aircraft having compound contours such as the frame section 58 shown in FIGS. 3 and 4. However, the tool 48 may have any of a variety of other configurations having tight radii or features that may ply forming difficult. Although not shown in the Figures, the tool 48 may include one or more indexing features or points thereon which permit the tool 48 to be indexed within the coordinate system used by the manipulator 214.

In one embodiment, shown in FIG. 18, a single forming head 214 may be used to individually form and compact each section 222 of the ply 46 onto the tool 48, while in other embodiments, multiple forming heads 214 may be used to form and compact one or more sections 222 of the ply 46. In those applications where a single forming head 214 is used to form and compact the ply 46, the manipulator 218 may have sufficient reach to move the forming head 216 around the tool 48 in order to form and compact all of the sections 222 in any desired order. In other applications, the manipulator 218 may be mounted on a mobile platform (not shown) to allow the forming head 214 to be moved to various positions (indicated in broken lines in FIG. 18) in order to carry out the forming operations using a single forming head 216.

Figure 19:
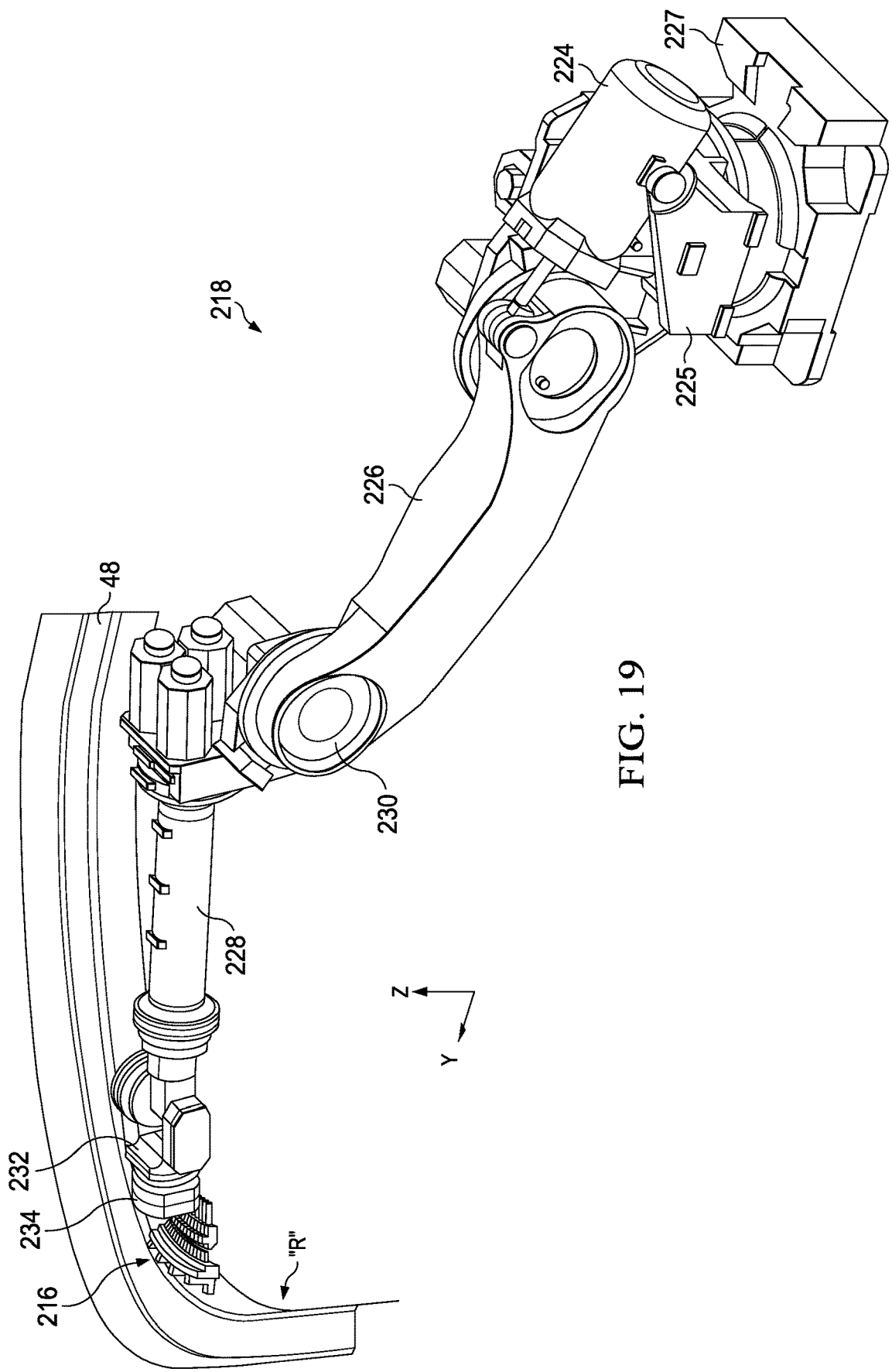
FIG. 19 is an illustration of a perspective view of the apparatus shown in FIG. 18, a ply and ply carrier not shown for clarity.
Figure 20:
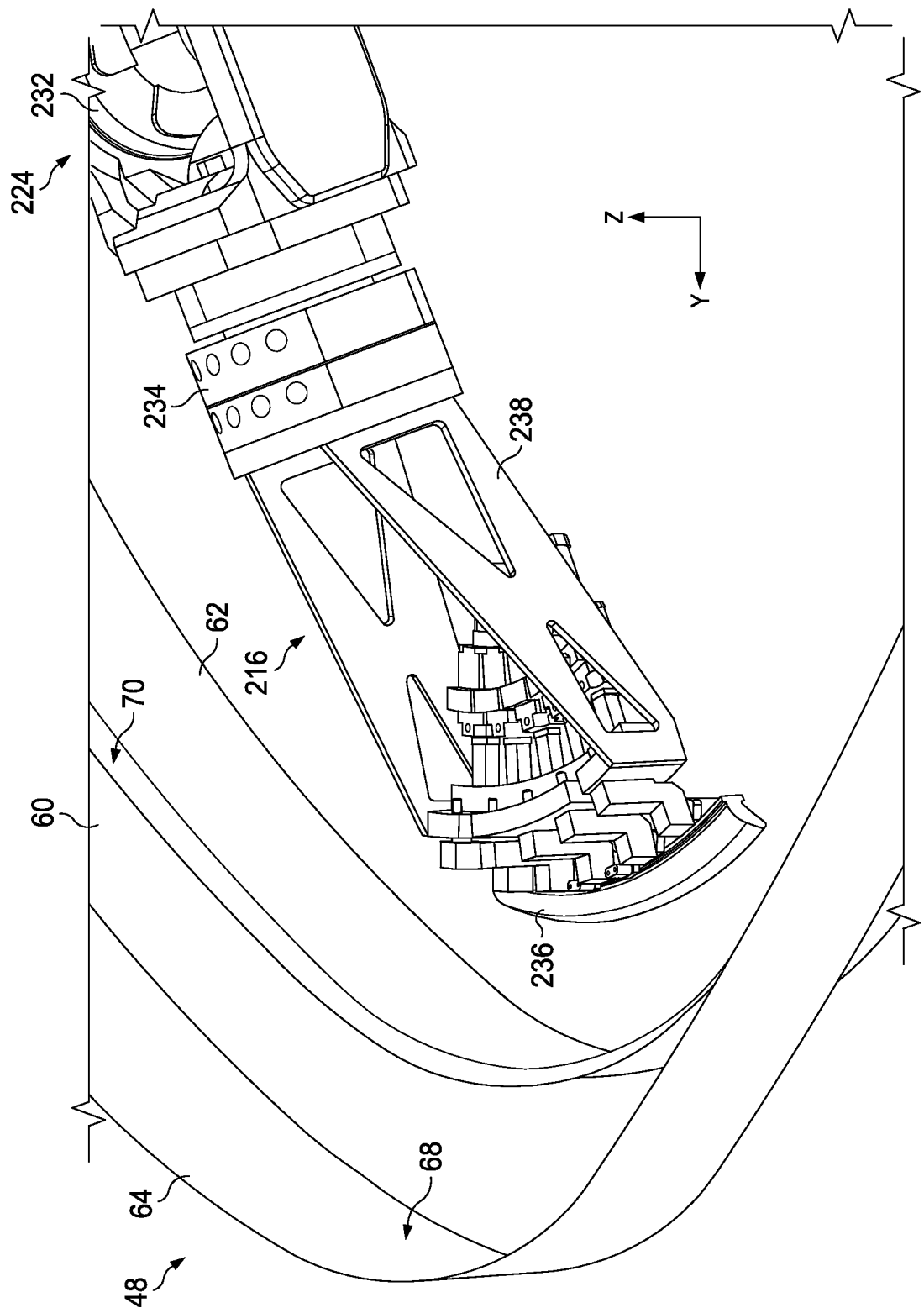
FIG. 20 is an illustration of a perspective view of the forming head approaching the contoured tool.
Figure 21:
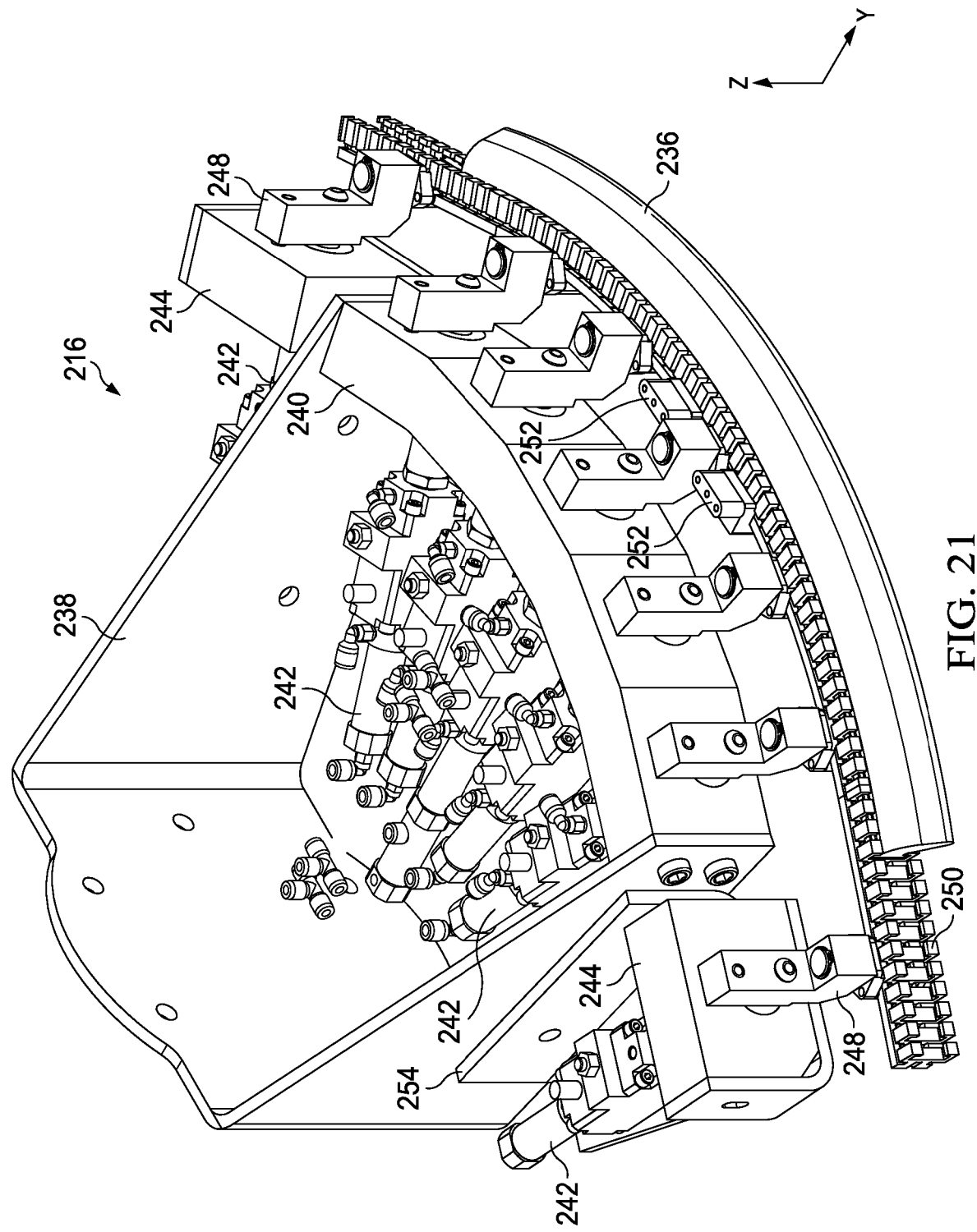
FIG. 21 is an illustration of a front perspective view of the forming head shown in FIG. 20.
Figure 22:
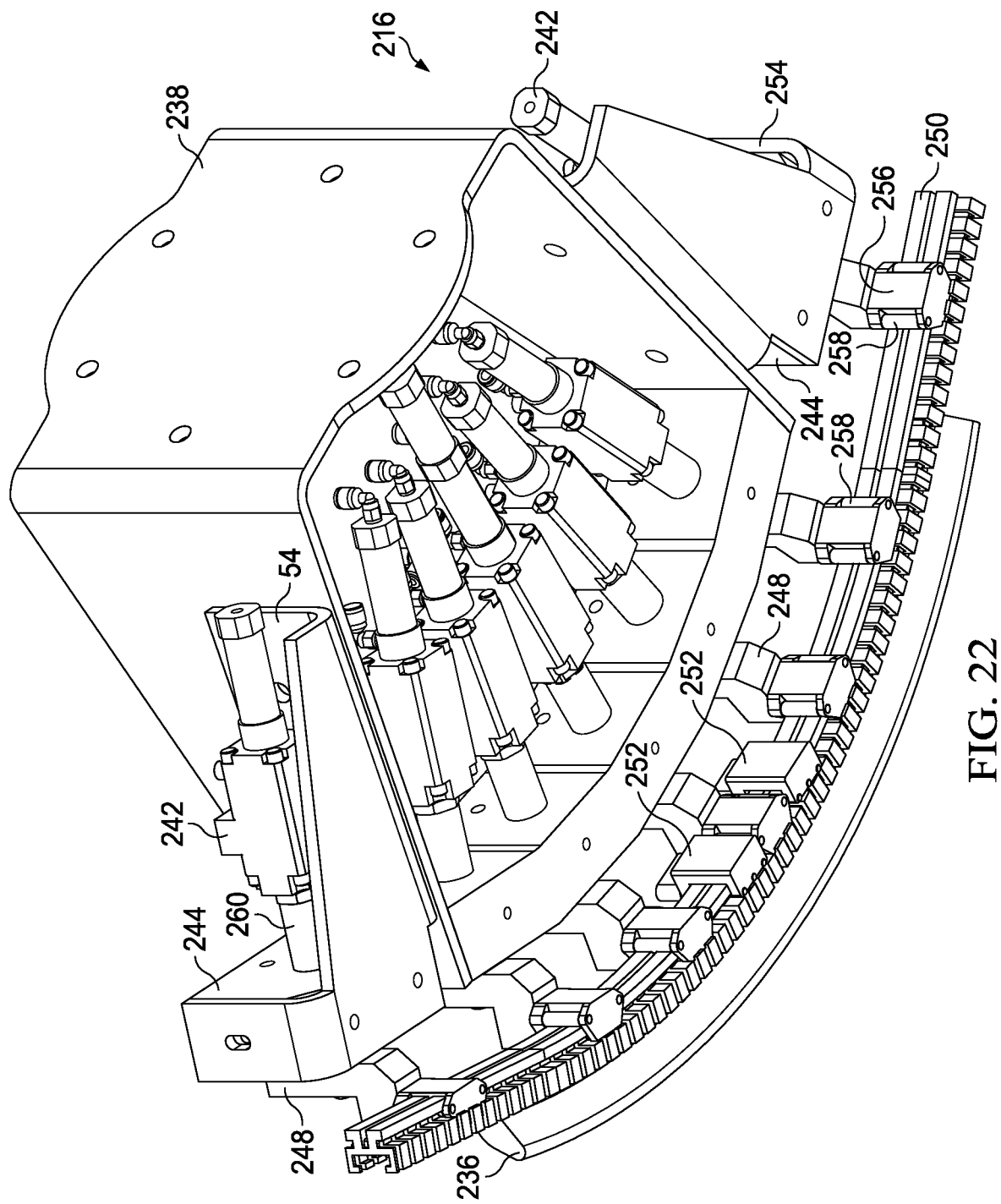
FIG. 22 is an illustration of a rear perspective view of the forming head.
Figure 23:
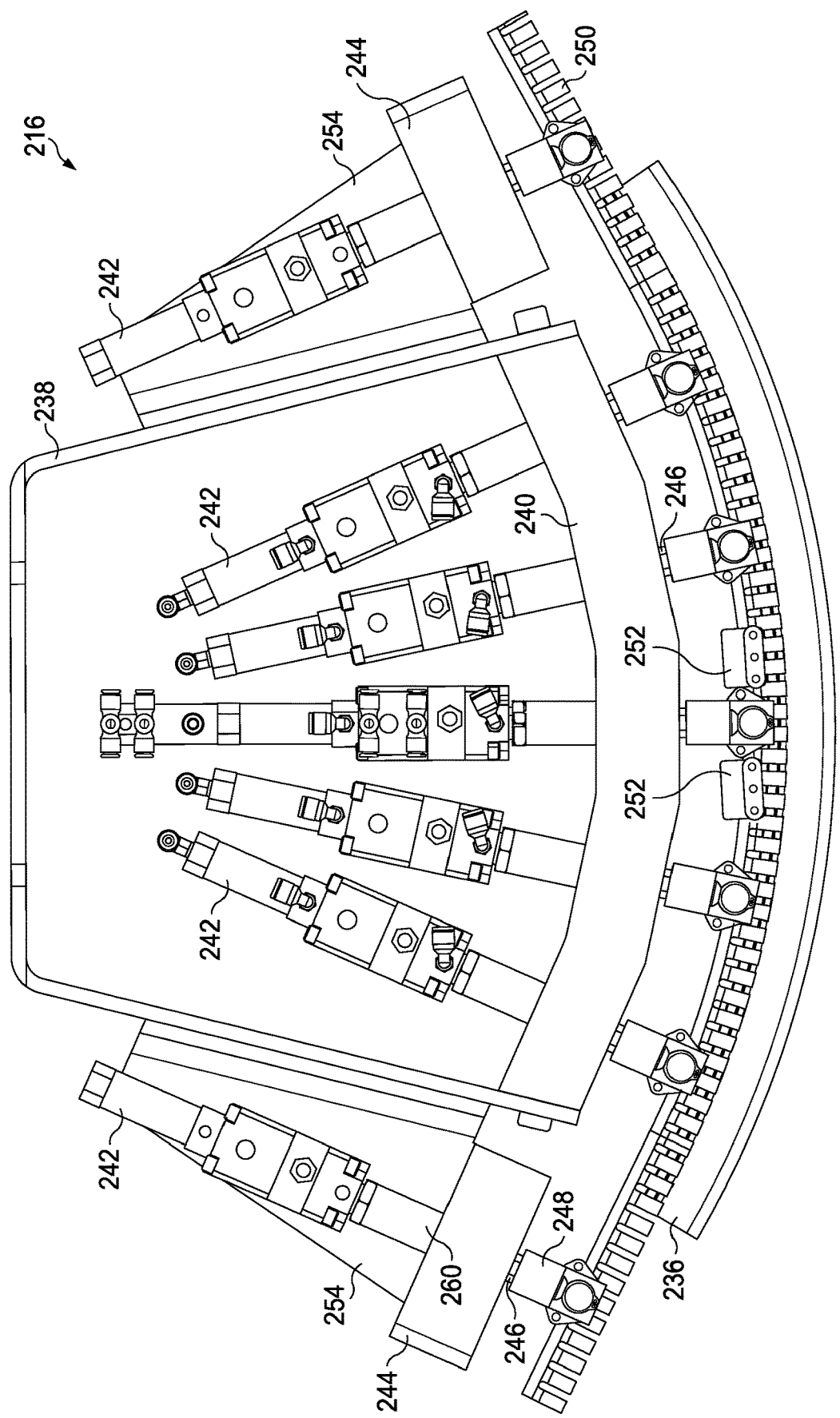
FIG. 23 is an illustration of a top plan view of the forming head.
Figure 24:
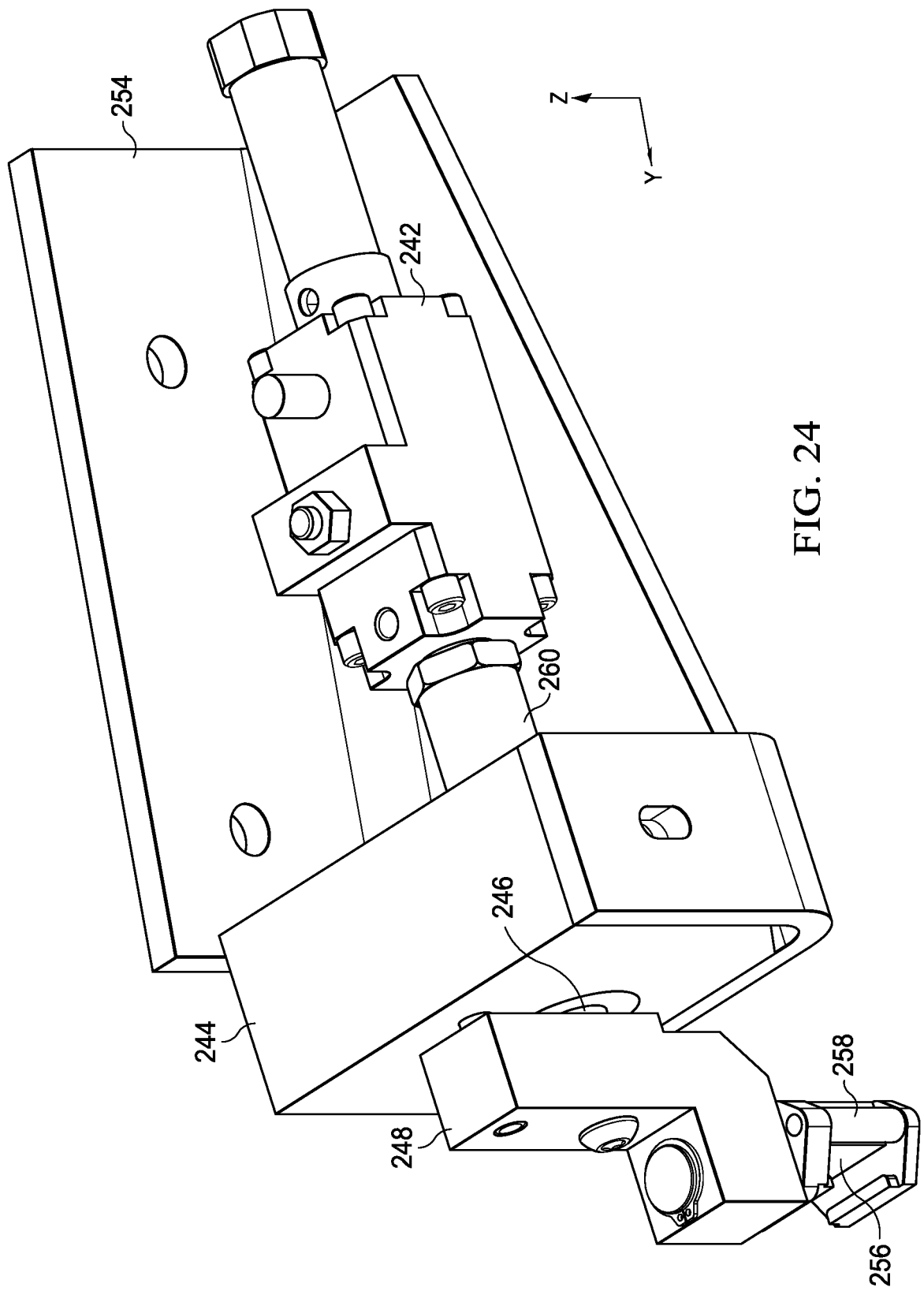
FIG. 24 is an illustration of a perspective view showing details of the forming head.

FIGS. 19 and 20 illustrate an embodiment of the forming head 214 in which a forming head 216 is employed as an end effector on a manipulator 218. In this example, the manipulator 218 comprises an articulated arm robot 224 having multiple DOFs (degrees of freedom), for example 6 DOF. The robot 224 comprises an inner arm 226 coupled by an elbow 230 to an outer arm 228. The inner arm 226 is mounted on a base 227 by a shoulder joint 225. A wrist 232 on the outer arm 228 is provided with a quick change adapter 234 that is configured to releasably mount the forming head 216 on the robot 224.

As best seen in FIG. 20, the forming head 216 includes a compliant nosepiece 236, sometimes referred to herein as a forming member, which may be generally similar to the nosepiece 116 (FIG. 12) previously described. The robot 224 brings the nosepiece 236 into engagement with a local section 222 (FIG. 18) of a ply (not shown in FIG. 20) and forms the ply 46 against surfaces of the contoured tool 48 which, in the illustrated example comprise a web 60 that joins an inner chord flange 62 with an outer chord flange (shear tie) 64, all of which are contoured along their respective lengths and may have one or more sections having tight radii of curvature "R". The inner chord flange 62 is connected to the web 60 by an inner chord radius 70, and the shear tie 64 is connected to the web 60 by a shear tie radius 68. As will be described below in more detail, the robot 224 moves the nosepiece 236 along the Y and Z axes to form and compact local sections 222 of one or more plies 46 against the tool 48.

Attention is now directed to FIGS. 21-24 which illustrate additional details of the forming head 216. The forming head 216 includes a support bracket 238 that is configured to be releasably mounted on the quick release adapter 234 (FIG. 20). A group of actuators 242 is generally arranged in an arc, and each of the actuators 242 includes a guide nose 260 that secures the actuator 242 to a forward mounting block 240 carried on the support bracket 238. Depending upon the application and the length of the segment 222 of a ply 46 being formed, one or more outer actuators 242 may be attached to expansion blocks 244 that are secured to opposite sides of the support bracket 238 by attachment plates 254. Each of the actuators 242 includes a displaceable actuator rod 246 that is guided by a guide nose and passes through one of the blocks 240, 244. In one variation, the actuators 242 may comprise pneumatic cylinders, however other types of actuators 242 are contemplated, including, but not limited to linear motor actuators and hydraulically driven actuators.

Swivel holders 248 are attached to the outer ends of the actuator rods 246 and are thus movable in and out (along the Y axis). T-slotted track holders 256 are rotatably mounted the swivel holders 248 and are configured to hold a flexible track 250. Each of the track holders 256 includes rollers 258 (FIG. 22) that facilitate longitudinal adjustment of the track 250 within the track holders 248. The flexible track 250 may be similar to the flexible track 118 (FIG. 11) previously described, wherein the track 118 can flex to any desired shape corresponding the shape of surfaces of the tool, including tight radii of curvature on the tool 48. As a will become apparent below, the swivel mounting of the track holders 256 in combination with the ability of the track 250 to move longitudinally within the track holders 256 allows the track to flex to the desired curvature.

The compliant nosepiece 236 is slidably received within and is held on the flexible track 250 using interlocking mounting elements similar to those previously described in connection with FIGS. 11 and 12. Clips 252 (FIGS. 21 and 22) attached to the flexible track 250 on opposite side of one of the track holders 256 may be used to fix the position of flexible track 250 on the track holders 256 once the flexible track 250 has been adjusted and configured to match features on the tool 48.

In use, the compliant nosepiece 236 is adjusted and configured to substantially match the curvature or other surface features of the contoured tool 48 onto which a section 222 of a ply 46 is to be formed and compacted. A desired contouring of the compliant nosepiece 236 is accomplished by adjusting the actuators 242, and more particularly the displacement of the actuating rods 246 relative to each other. As the actuators 242 are adjusted, the flexible track 250 is adjusted accordingly to generally match the geometry of a local section of the tool 48. More particularly, as the displacements of the actuator rods 246 are adjusted relative to each other, the contour of the flexible track 250 changes, resulting in the compliant nosepiece 236 bending to match local contours of the tool 48. As the contour of the flexible track 250 changes, the flexible track 250 is allowed to slide within the swivel holders 248.

In some embodiments, the actuators 242 may be manually adjusted to match local contours of the tool 48. However, it may be possible to perform adjustment of the actuators 242 using automatic controls wherein the actuators 242 are adjusted based on CAD files that define the contours and other surface features of the tool 48. Once the contour of the 236 has been adjusted to match local features of the tool 48, the clips 252 are used to prevent sliding of the flexible track 250 within the track holders 256.

Figure 25:
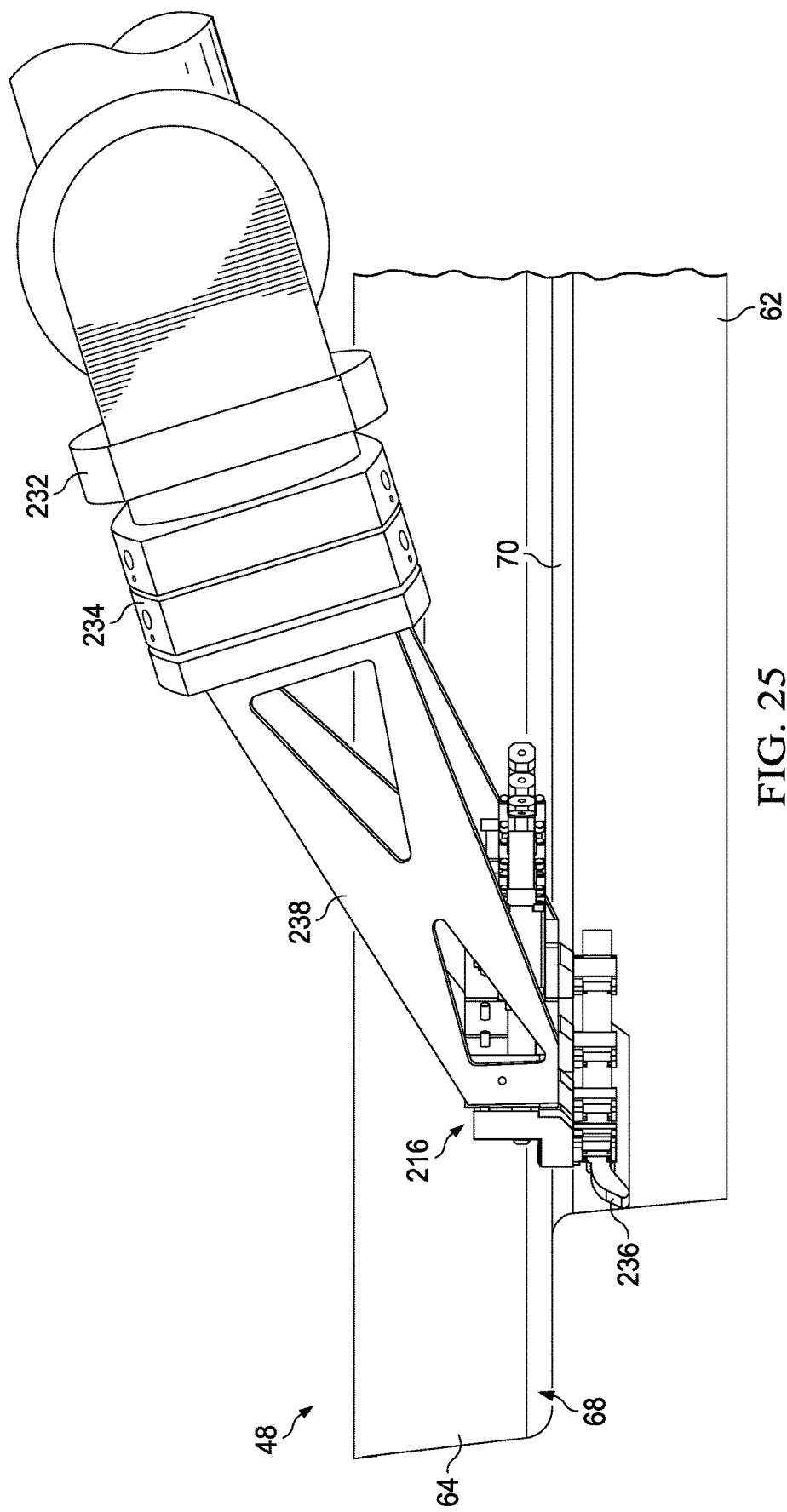
FIGS. 25-28 are perspective views showing sequential positions of the forming head during a local forming operation.

FIGS. 25-28 illustrate sequential movement of the forming head 216, and more particularly the movement of the compliant nosepiece 236, as the forming head 216 forms a ply 46 onto the tool 48. For sake of clarity in illustrating the movement of the 236 relative to features of the tool 48, a ply carrier and a ply placed thereon are not shown in these Figures. FIG. 25 shows the nosepiece 236 sweeping over the inner chord flange 62, approaching the inner chord radius 70. Movement of the nosepiece 236 during this phase of sweeping is substantially entirely controlled by robotic movement of the forming head 216 upwardly along the Z axis. Then, referring to FIG. 26, the nosepiece 236 is swept over the inner chord radius 70 by the robot 224.

Figure 26:
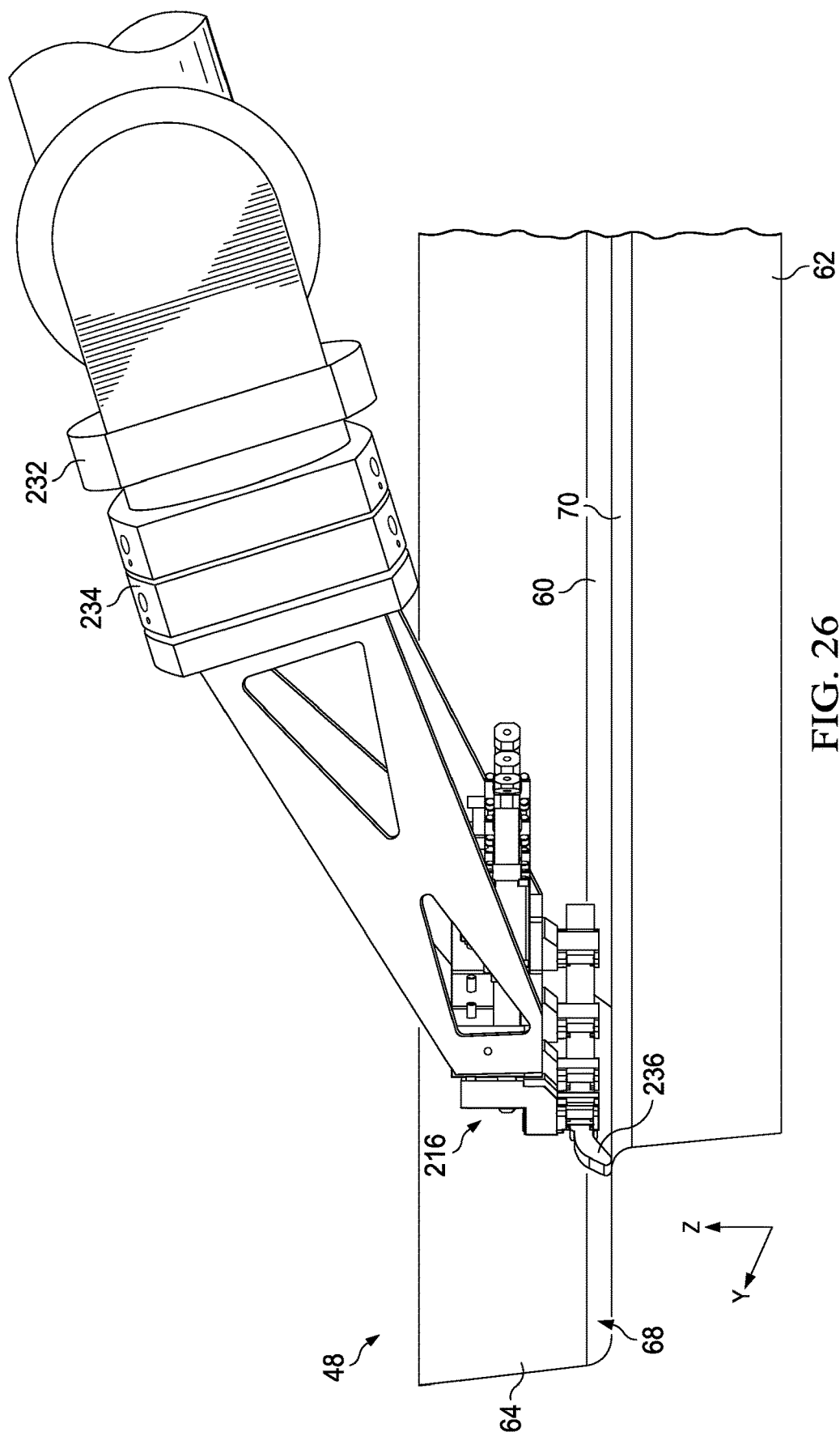
Figure 27:
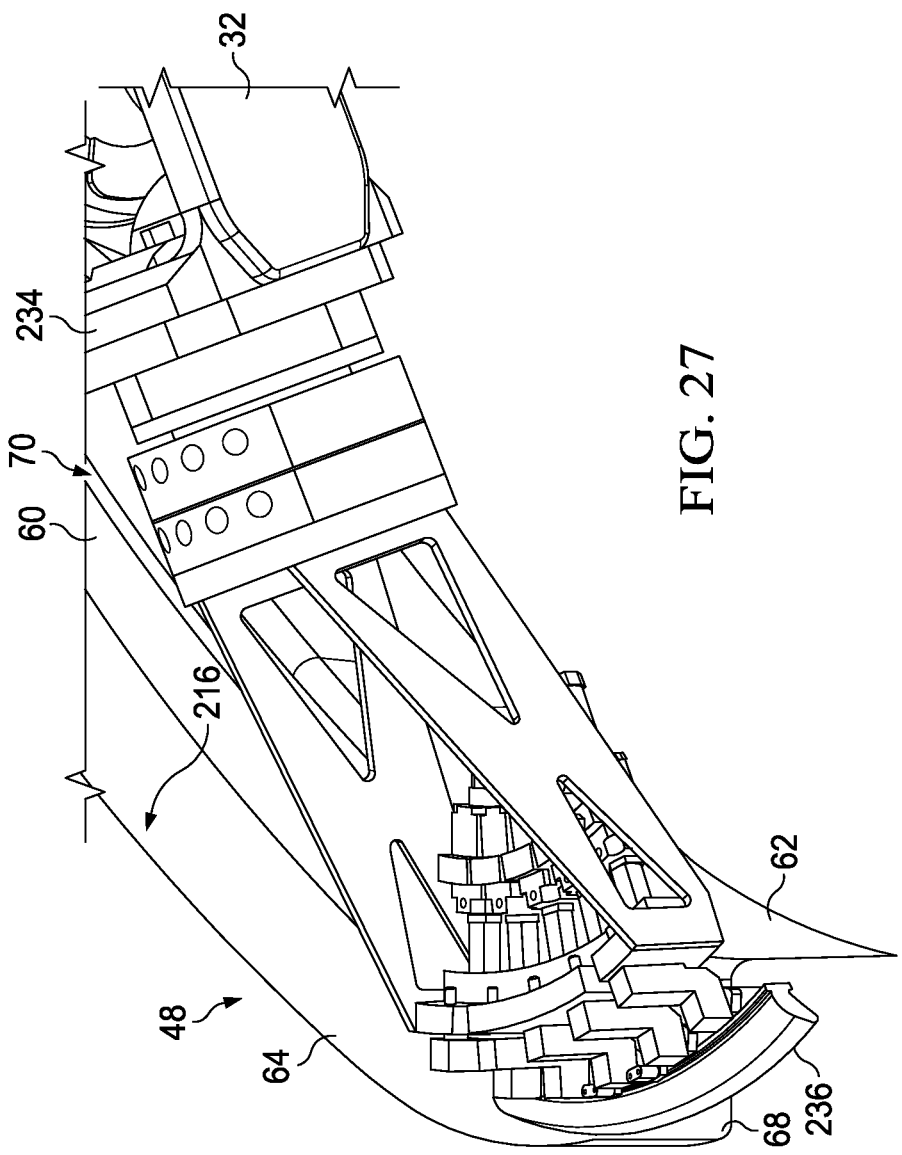
Figure 28:
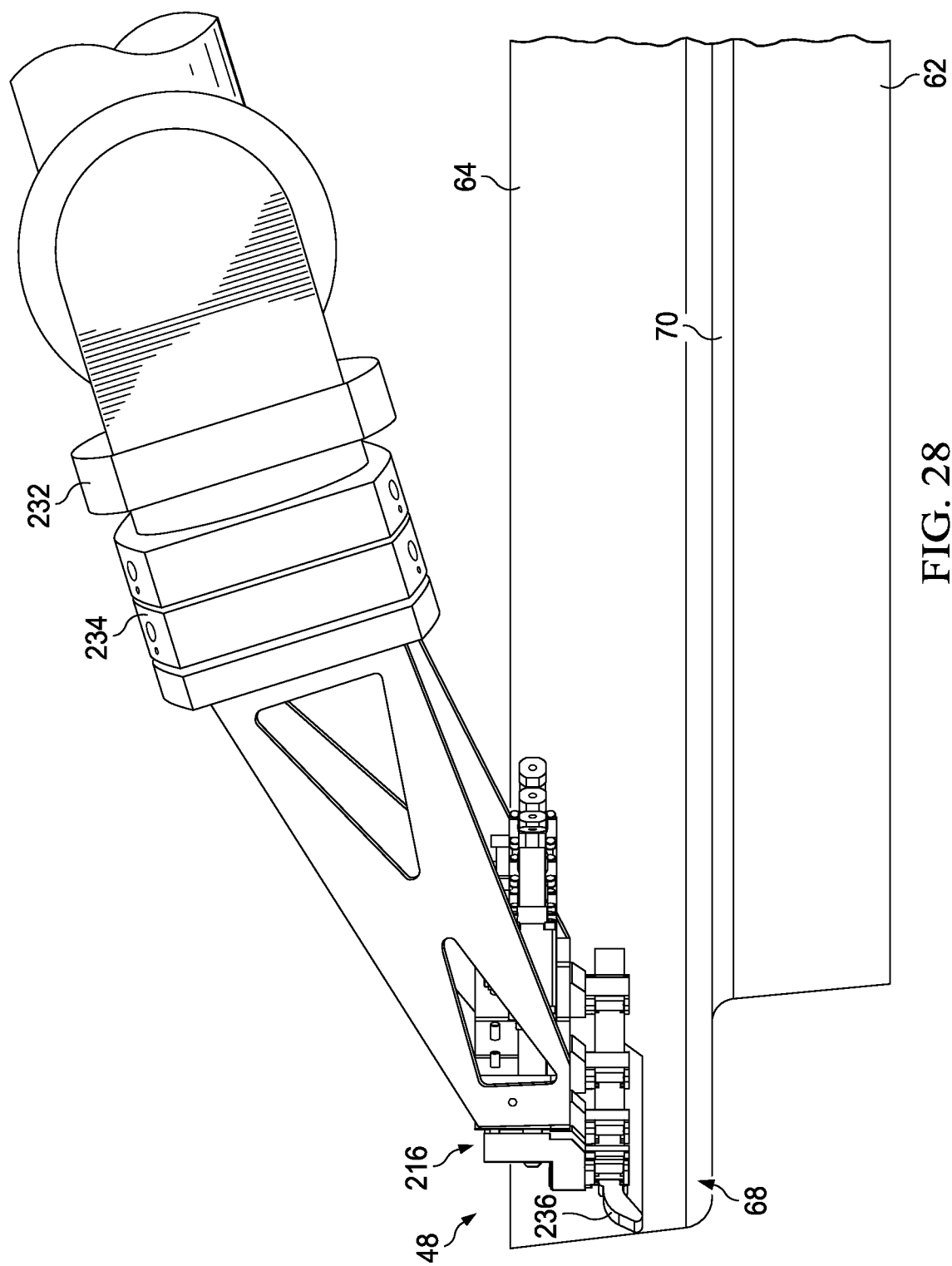

Next in the ply forming sequence, as shown in FIG. 26, the robot 224 sweeps the nosepiece 236 in the Y axis direction over the web 60 until the nosepiece 236 reaches the shear tie radius 68. Then, as shown in FIG. 27, the nosepiece 236 is swept by the robot 224 over the shear tie radius 68. Finally, as shown in FIG. 28, movement of the forming head 214 provided by the robot 224 causes the nosepiece 236 to sweep over the shear tie 64. In additional to providing the programmed sweeping motions of the forming head 216 necessary to form local sections 222 of the ply 46 onto the tool 48, the robot 224 compacts the ply 46 against the tool 48 by applying force to the forming head 216 which is transmitted to the ply 46 through the compliant nosepiece, 236. In some embodiments, the actuators 242 may be adjusted during a ply sweep to apply an additional compaction force to the ply 46.

In one embodiment, the configuration (contour) of the nosepiece 236 may remain constant throughout the ply forming and compacting process. However, depending on the geometry of the tool 48, it may be desirable or necessary to change the configuration of the nosepiece 236 as it is being swept over the ply 46. Changing the configuration of the nosepiece 236 during a ply sweep may be accomplished by manually adjusting the actuators 242 at one or more predetermined points during a ply sweep. However, in embodiments where the actuators 242 are automatically controlled according to preprogrammed instructions using a controller 220 (FIG. 18), the nosepiece configuration adjustment may be fully automated, and may be performed at any point during, or dynamically throughout, the ply sweeping process.

Figure 29:
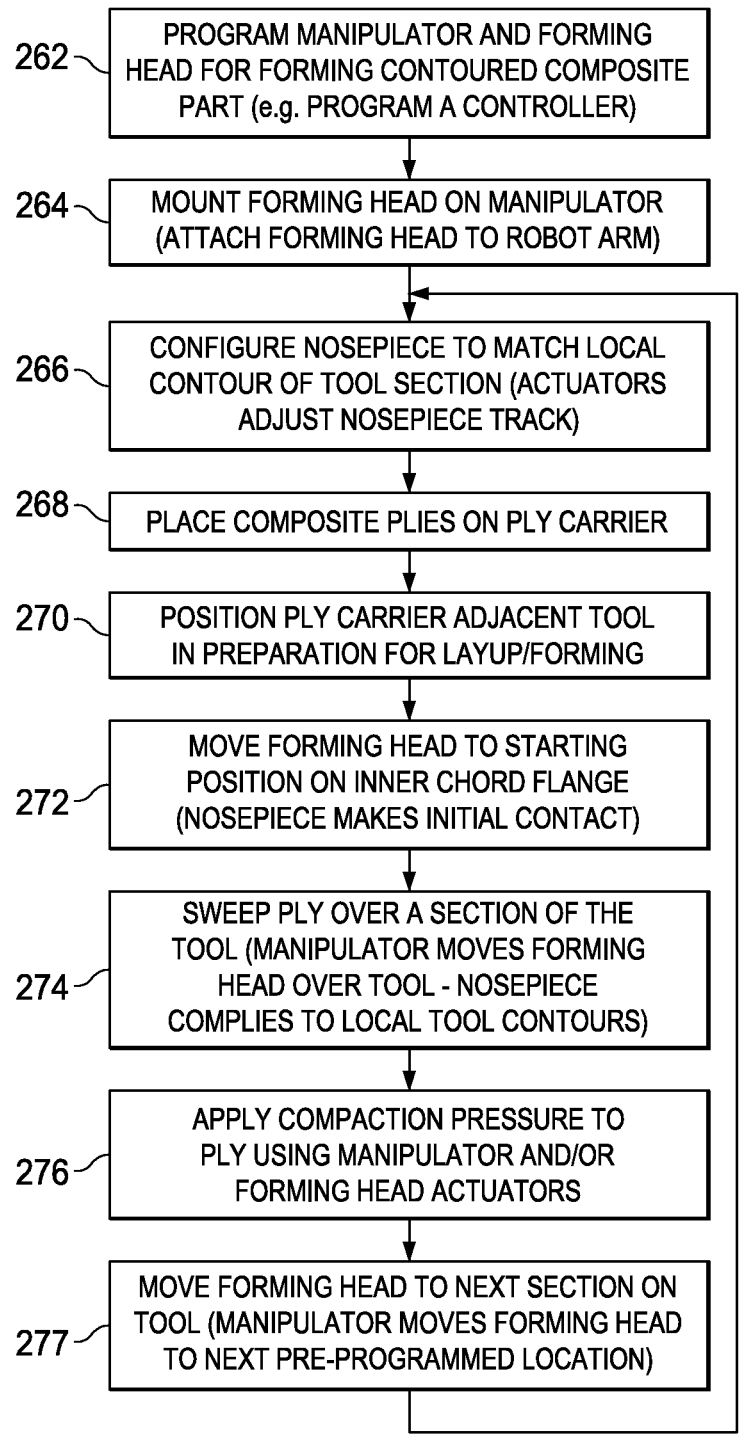
FIG. 29 is an illustration of a flow diagram of a method of forming a contoured composite laminate having tight radii of curvature.

FIG. 29 broadly illustrates the steps of a method of forming and compacting one or more composite plies 46 on a contoured tool 48, especially a tool 48 having tight radii of curvature or other difficult-to-form tool features. Beginning at 262, a manipulator 218 and a forming head 216 are programmed for forming contoured composite parts, which may include programming a suitable controller 220 for controlling operation of the manipulator 218 and the forming head 216. In one embodiment, programming of the controller 220 may include manually moving the nosepiece 236 over contours of the tool 48 in order to "teach" the manipulator 218 the locations of the tool surfaces. However in other embodiments, the controller 220 may retrieve digital data representing the tool surfaces from a CAD file (not shown), thus eliminating the need for a teaching process. At 264, the forming head 216 is mounted on the manipulator 218, as by attaching the forming head 216 to a robotic arm. At 266, a nosepiece 236 is configured to substantially match local contours or other features of a section of a tool 48 on which one or more plies 46 are to be formed and compacted. Then, at 268 one or more composite plies 46 are placed in a registered position on a ply carrier 84 (FIG. 10). At 270, the ply carrier 84 is positioned adjacent the tool 49 in preparation for a layup, forming and compaction operation.

At 272, the forming head 216 is moved to a starting position on a location of the tool 48, such as on the inner chord flange 62 where the nosepiece 236 makes initial contact with the tool 48. At 274, the ply or plies 46 are swept over a section of the tool 48 using the manipulator 218 to move the forming head 216 over the tool 48. During the sweeping operation, the nosepiece 236 on the forming head 216 complies with local tool curvatures or other surface features of the tool 48. At 276, compaction pressure is applied to the plies 46 using force applied by the manipulator 218. In some embodiments, however, optionally, the forming head actuators 242 may be employed to apply additional compaction pressure to the plies 46. At 277, the manipulator 218 moves the forming head 216 to another preprogrammed section on the tool 48 where the forming and compaction operations described above are repeated. Steps 266-272 are repeated until all the sections 222 of the ply or plies 46 are formed and compacted onto the tool 48.

Figure 30:
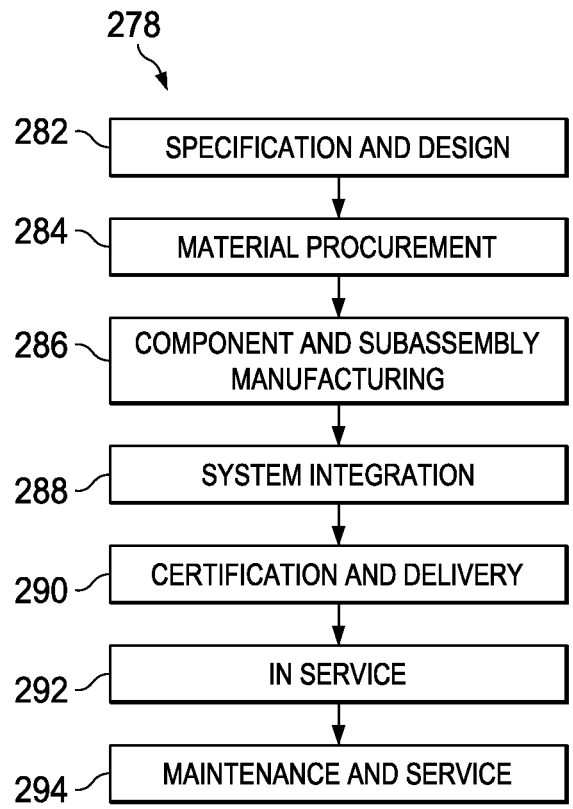
FIG. 30 is an illustration of a flow diagram of aircraft production and service methodology.
Figure 31:
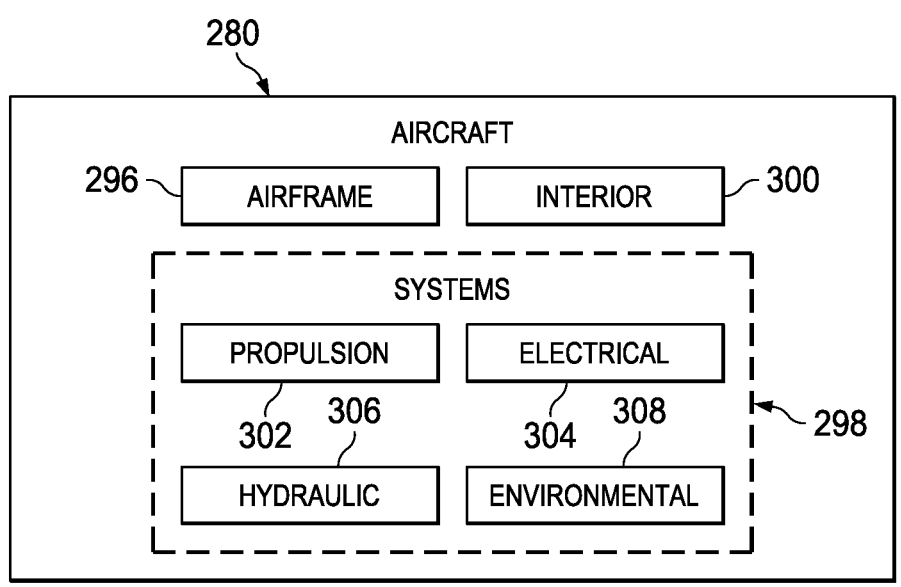
FIG. 31 is illustration of a block diagram of an aircraft.

Embodiments of the disclosure may find use in a variety of potential applications, particularly in the transportation industry, including for example, aerospace, marine, automotive applications and other application requiring automated fabrication of a variety of parts within a family of parts having common features or characteristics. Thus, referring now to FIGS. 30 and 31, embodiments of the disclosure may be used in the context of an aircraft manufacturing and service method 278 as shown in FIG. 30 and an aircraft 280 as shown in FIG. 31. Aircraft applications of the disclosed embodiments may include, for example, without limitation, fuselage contoured frame sections, spars, stringers and other structural members, to name only a few. During pre-production, exemplary method 278 may include specification and design 282 of the aircraft 280 and material procurement 284. During production, component and subassembly manufacturing 286 and system integration 288 of the aircraft 278 takes place. Thereafter, the aircraft 280 may go through certification and delivery 290 in order to be placed in service 292. While in service by a customer, the aircraft 280 is scheduled for routine maintenance and service 294, which may also include modification, reconfiguration, refurbishment, and so on.

Each of the processes of method 278 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 31, the aircraft 280 produced by exemplary method 278 may include an airframe 296 with a plurality of systems 298 and an interior 300. Examples of high-level systems 298 include one or more of a propulsion system 302, an electrical system 304, a hydraulic system 306, and an environmental system 308. Any number of other systems may be included. Although an aerospace example is shown, the principles of the disclosure may be applied to other industries, such as the marine and automotive industries.

Systems and methods embodied herein may be employed during any one or more of the stages of the production and service method 278. For example, components or subassemblies corresponding to production process 286 may be fabricated or manufactured in a manner similar to components or subassemblies produced while the aircraft 280 is in service. Also, one or more apparatus embodiments, method embodiments, or a combination thereof may be utilized during the production stages 286 and 288, for example, by substantially expediting assembly of or reducing the cost of an aircraft 280. Similarly, one or more of apparatus embodiments, method embodiments, or a combination thereof may be utilized while the aircraft 278 is in service, for example and without limitation, to maintenance and service 294.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for forming composite plies on a contoured tool, comprising:
   a manipulator;
   a forming head mounted on the manipulator for forming the composite plies on the contoured tool, the forming head comprising:
      a flexible track comprising a plurality of spaced apart segments that are spaced apart along the flexible track, permitting the flexible track to flex as required to conform to the contoured tool;
      a unitary compliant nosepiece extending along a length of the flexible track with portions of the unitary compliant nosepiece being removably mounted in each of the plurality of spaced apart segments, wherein the unitary compliant nosepiece is adapted to conform to the contoured tool and to contact and sweep laminate plies over the contoured tool along at least two axes of movement of the forming head; and
      a plurality of actuators coupled with the unitary compliant nosepiece, wherein the plurality of actuators is respectively configured to locally displace corresponding sections of the unitary compliant nosepiece; and
   a controller configured:
      to learn a geometry of the contoured tool by encoding force feedback received when the unitary compliant nosepiece is brought into contact with the contoured tool; and
      based on the encoded force feedback, to adjust the plurality of actuators to a configuration that substantially matches the unitary compliant nosepiece to local contours of the contoured tool.

2. The apparatus of claim 1 further comprising an articulated arm robot.

3. The apparatus of claim 1, wherein the forming head further includes:
   a support bracket coupled with the manipulator; and
   wherein the unitary compliant nosepiece and the plurality of actuators are carried on the support bracket.

4. The apparatus of claim 3, wherein:
   each of the plurality of actuators is a pneumatic cylinder having an actuator rod; and
   each actuator rod is connected with the flexible track.

5. The apparatus of claim 1, wherein the forming head further includes:
   a groove in the flexible track, wherein the unitary compliant nosepiece is removably mounted in the groove.

6. The apparatus of claim 1, further comprising:
   a plurality of track holders swivel mounted on the forming head and linearly displaceable relative to the manipulator, wherein the flexible track is removably held in the plurality of track holders.

7. An end effector for forming composite plies on a contoured tool comprising:
   a unitary compliant nosepiece configured to contact and sweep the composite plies onto the contoured tool along at least two axes of movement of the end effector;
   a flexible track comprising a plurality of spaced apart segments in which portions of the unitary compliant nosepiece are removably mounted, wherein the unitary compliant nosepiece extends along a length of the flexible track, wherein the plurality of spaced apart segments is spaced apart along the flexible track, permitting the flexible track to flex as required to conform to the contoured tool;
   a plurality of actuators for applying force to the unitary compliant nosepiece; and
   a controller configured:
      to learn a geometry of the contoured tool by encoding force feedback received when the unitary compliant nosepiece is brought into contact with the contoured tool; and
      based on the encoded force feedback, to adjust the plurality of actuators to a configuration that substantially matches the unitary compliant nosepiece to local contours of the contoured tool.

8. The end effector of claim 7, wherein the actuators are coupled with the flexible track and are respectively configured to locally displace corresponding sections of the unitary compliant nosepiece.

9. The end effector of claim 7, further comprising:
   a bracket adapted to be coupled with a manipulator; and
   a mounting block attached to the bracket, wherein the actuators are mounted on the mounting block.

10. The end effector of claim 7, further comprising:
    a plurality of track holders respectively coupled with the actuators for holding the flexible track.

11. The end effector of claim 10, wherein the track holders are pivotally connected with the actuators.

12. The end effector of claim 10, wherein:
    each of the actuators includes a displaceable actuator rod, wherein the track holders are respectively attached to the displaceable actuator rods.

13. The end effector of claim 7, wherein the actuators are arranged in an arc generally matching a contour of the contoured tool.

14. The end effector of claim 7, further comprising:
    a groove in the flexible track, wherein the unitary compliant nosepiece is removably mounted in the groove.

15. The end effector of claim 7, further comprising:
    a plurality of track holders swivel mounted on the end effector and linearly displaceable relative to the end effector, wherein the flexible track is removably held in the plurality of track holders.

16. A method of forming a composite ply on a contoured tool, comprising:

mounting a forming head on an automatically controlled manipulator, the forming head comprising a flexible track comprising a plurality of spaced apart segments that are spaced apart along the flexible track, permitting the flexible track to flex as required to conform to the contoured tool;

removably mounting portions of a unitary compliant nosepiece in each of the plurality of spaced apart segments such that the unitary compliant nosepiece extends along a length of the flexible track;

bringing the forming head into contact with the contoured tool;

encoding force feedback received when the unitary compliant nosepiece is brought into contact with the contoured tool to learn a geometry of the contoured tool;

based on the encoded force feedback, adjusting a plurality of actuators to a configuration that substantially matches the unitary compliant nosepiece to local contours of the contoured tool, wherein the plurality of actuators is coupled with the unitary compliant nosepiece and is respectively configured to locally displace corresponding sections of the unitary compliant nosepiece;

forming the composite ply onto the contoured tool at each of the sections along the contoured tool, including using the automatically controlled manipulator to apply a pressure to the composite ply with the unitary compliant nosepiece and to sweep laminate plies over the contoured tool along at least two axes of movement of the forming head.

17. The method of claim 16, wherein moving the forming head is performed by the automatically controlled manipulator.

18. The method of claim 16, wherein moving the forming head is performed using a robotic arm.

19. The method of claim 18, wherein forming the composite ply on the contoured tool includes using the robotic arm to apply a pressure to the forming head.

20. The method of claim 16, wherein forming the composite ply on the contoured tool includes configuring a forming member to substantially match contours of the contoured tool, including using the plurality of actuators to configure the forming member.

21. A method of forming a composite ply on a contoured tool, comprising:

bringing a forming head into proximity with a location on the contoured tool, including moving the forming head using a robotic arm, wherein the forming head comprises a flexible track comprising a plurality of spaced apart segments in which portions of a unitary compliant nosepiece are removably mounted;

configuring the unitary compliant nosepiece on the forming head to substantially match a contour on the contoured tool, including:

bringing the forming head into contact with the contoured tool;

encoding force feedback received when the unitary compliant nosepiece is brought into contact with the contoured tool to learn a geometry of the contoured tool;

adjusting a plurality of actuators based on the encoded force feedback to a configuration that substantially matches the unitary compliant nosepiece to local contours of the contoured tool, wherein the plurality of actuators is coupled with the unitary compliant nosepiece and is respectively configured to locally displace corresponding sections of the unitary compliant nosepiece;

positioning a ply adjacent the contoured tool;

bringing the unitary compliant nosepiece into contact with the ply;

moving the unitary compliant nosepiece over the contoured tool using the robotic arm along at least two axes of movement of the forming head; and applying pressure to the composite ply using the robotic arm during moving the unitary compliant nosepiece over the contoured tool to sweep laminate plies over the contoured tool along at least two axes of movement of the forming head.

22. The method of claim 21, further comprising:

applying pressure to the ply using the actuators.

\* \* \* \* \*